(12) United States Patent
Drane

(10) Patent No.: US 7,271,351 B2
(45) Date of Patent: Sep. 18, 2007

(54) MODULAR POKE-THROUGH FLOOR DEVICE

(75) Inventor: Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/471,950

(22) Filed: Jun. 21, 2006

(65) Prior Publication Data

US 2006/0283631 A1  Dec. 21, 2006

Related U.S. Application Data

(60) Provisional application No. 60/692,384, filed on Jun. 21, 2005.

(51) Int. Cl.
  *H02G 3/04* (2006.01)
(52) U.S. Cl. .................. 174/483; 174/50; 174/482; 174/488; 439/138
(58) Field of Classification Search ............. 174/483, 174/50, 482, 488; 439/535, 650, 652, 138, 439/142; 52/220.1, 220.8, 220.5; 220/3.4, 220/3.7, 4.02, 3.8
See application file for complete search history.

(56) References Cited

U.S. PATENT DOCUMENTS 3,921,229 A  *  11/1975  Yavitch ............. 4/252.5
4,323,724 A    4/1982  Shine
4,496,790 A    1/1985  Spencer
4,573,297 A    3/1986  Benscoter et al.
4,770,643 A    9/1988  Castellani et al.
5,003,127 A    3/1991  Sosinski et al.
5,107,072 A    4/1992  Morgan
5,466,886 A   11/1995  Lengyel et al.
5,486,650 A    1/1996  Yetter
6,018,126 A    1/2000  Castellani et al.
6,114,623 A    9/2000  Bonilla et al.
6,175,078 B1   1/2001  Bambardekar et al.
6,307,152 B1  10/2001  Bonilla et al.
6,395,978 B1   5/2002  Whitehead et al.
6,417,446 B1   7/2002  Whitehead
6,551,130 B2   4/2003  Bonilla
7,053,296 B2   5/2006  Drane et al.

* cited by examiner

*Primary Examiner*—Dhiru R. Patel
(74) *Attorney, Agent, or Firm*—Hoffmann & Baron, LLP

(57) ABSTRACT

A poke-through device for installation in a hole in a floor structure. The floor structure defining a floor in a first working environment and a ceiling in a second working environment. The second working environment including a junction box. The poke-through device including a body having upper and lower ends and sized for insertion within the hole. The lower end communicating with the junction box and the upper end including a receptacle-receiving basket. The basket defining a peripheral wall, wherein the wall includes at least one channel extending in a direction generally perpendicular to the floor. Also included is a connector supporting bracket sized to removeably engage the channel, wherein the bracket is maintained in a stationary position upon installation.

18 Claims, 26 Drawing Sheets

MODULAR POKE-THROUGH FLOOR DEVICE

This application claims the benefit of U.S. Provisional Application No. 60/692,384 filed Jun. 21, 2005.

BACKGROUND OF THE INVENTION

A poke-through device or simply a "poke-through" is a common device that enables power, data or other cabling to pass through a hole in a floor of a structure, generally a concrete floor. A Fire and/or smoke retardant element, particularly intumescent material, is incorporated within the poke-through to seal the floor opening in the event of a fire. This helps prevent a fire or the smoke from spreading from one floor to the next.

Generally, during the design stage of a building, decisions are made as to the desired location of various types of electrical service. Such service can include power, phone, data or other special cabling that needs to be extended to that particular location. Accordingly, building plans are developed that show the type of connectors to install at each such location to accommodate conventional electrical and/or data service(s). For example, the decision to provide 110 volts, 220 volts or some other voltage at a particular location affects the power cabling and types of connectors that will have to be installed, such as but not limited to duplex, GFCI, or round. In addition, the particular data cabling desired must be chosen according to the requirements needed at a particular location. For example, different data cabling and connector types will be required depending on whether a data connection is needed for telephone, co-axial, USB, fiber optics or other types of data communication. Furthermore, for servicing both power and data handling needs, the quantity of each connector type at each service location must be identified.

However, detailed information, such as what types of connectors are needed at each individual poke through, is not generally available at the early stages of building design or construction. Instead, building plans typically call for a poke-through at a particular location without indicating the particular service, type of connector or quantity to be supplied at any particular poke-through location. This greatly complicates the process of planning and ordering these devices. Without knowing the final power or data configurations purchasers can not place orders for these devices. Similarly, the manufacturers must hold-off in their production and assembly.

Even further complications occur in the later stages of construction. Namely, even when the connector detail is known, so that ordering and manufacturing of the poke-through insert can begin, often such specifications are incorrect or it is determined later that they need to be changed. Thus, a poke-through may already be undergoing assembly when the specifications concerning the service this poke-through is to provide changes. Alternatively, as the building nears completion, a change may be made which affects a poke-through that is already on the job-site. Hence the device will need to be returned and replaced with a different one. This will obviously cause delays in construction and increase costs by lowering efficiencies.

From a manufacturer's perspective, the type of end service to be provided by a conventional poke-through greatly dictates the components and configuration of the final product. A poke-through that only supplies power will be assembled differently than a poke-through that only supplies data connectors. Likewise, the configuration of a poke-through that supplies a combination of power and data will vary depending on the quantity of power and data components to be installed. Thus, a manufacturer typically needs to have the final requirements of a poke-through before the appropriate product can be assembled. Likewise, if the needs of the poke-through change at any time, a whole new poke-through will need to be constructed since the old one is not likely to be adaptable to the new requirements.

There is a need, therefore, for a poke-through device that is modular in construction, and that can be retrofit after manufacture or even after installation, in order to accommodate last-minute changes to the requirements of a poke-through.

SUMMARY OF THE INVENTION

The present invention relates to a poke-through device for installation in a hole in a floor structure. The floor structure defining a floor in a first working environment and a ceiling in a second working environment. The second working environment including a junction box. The poke-through device including a body having upper and lower ends and sized for insertion within the hole. The lower end communicating with the junction box and the upper end including a receptacle-receiving basket. The basket defining a peripheral wall, wherein the peripheral wall includes at least one channel extending in a direction generally perpendicular to the floor. Also included is a connector supporting bracket sized to removeably engage the channel, wherein the bracket is maintained in a stationary position upon installation.

The poke-through device as set forth above, can also have the at least one channel formed by two ribs protruding from the peripheral wall, the ribs extending generally perpendicular to the floor. Also, the ribs can include a top surface for supporting the bracket. The bracket can include a dividing wall for separating a first portion of the basket from a second portion of the basket. Additionally, an edge of the dividing wall can engage at least a portion of the channel. The bracket can include at least one protrusion conformed to mate with a recessed portion in the peripheral wall upon installation. Further, the poke-through can include at least one first connector for communicating data and/or power, at the at least one first connector can be mounted on the bracket. Further still, the poke-through can include at least one plate secured to the basket and/or the bracket for supporting the at least one first connector.

The poke-through device as set forth above, can further have the peripheral wall include at least one flange for engaging the floor and the at least one flange can extend generally parallel to the floor. Also, the bracket can include at least one flange for engaging the floor, the at least one flange extending generally parallel to the floor. Additionally, the body of the device can include at least one wire passageway for communicating the upper and lower ends. Further, at least one mounting cap can be disposed below the lower end, wherein the at least one mounting cap includes, at least one opening for communicating with the at least one passageway. Yet further, the at least one well can accommodate the bending of a wire passing therethrough, the well communicating with the opening. The at least one mounting cap can additionally include a first mounting cap configured for communicating at least one first wire and a second mounting cap configured for communicating at least one second wire. Further still, the at least one passageway can include more than one passageway, wherein the at least one opening can include more than one opening, and each of the passageways is in vertical alignment and communicates separately with one of the openings.

The poke-through device as set forth above, can further have as part of the body an intumescent member disposed between the basket and the at least one mounting cap. The at least one mounting cap can include at least one alignment recess and the intumescent member can include at least one protrusion conformed to mate with the alignment recess upon installation. Additionally, the intumescent member can include a hollow inner chamber for accommodating the bending of the wire therein.

Another aspect of the present invention relates to a poke-through device for installation in a hole in a floor structure. The floor structure is defined by a floor in a first working environment and a ceiling in a-second working environment. The hole includes a peripheral surface extending between the floor and the ceiling. The poke-through device includes a body adapted to be secured within and sized to conform to the hole. The body includes an upper end and a lower end communicating respectively with the first and second working environments. Also, the upper end includes a receptacle-receiving basket. The basket includes at least one peripheral wall covering a substantial portion of the peripheral surface. Also, the basket includes at least one flange extending from an upper portion of the peripheral wall for engaging the floor. Additionally, at least one connector supporting bracket is removeably secured within at least a portion of the basket. Further, the at least one bracket can be slidingly mounted to the basket.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
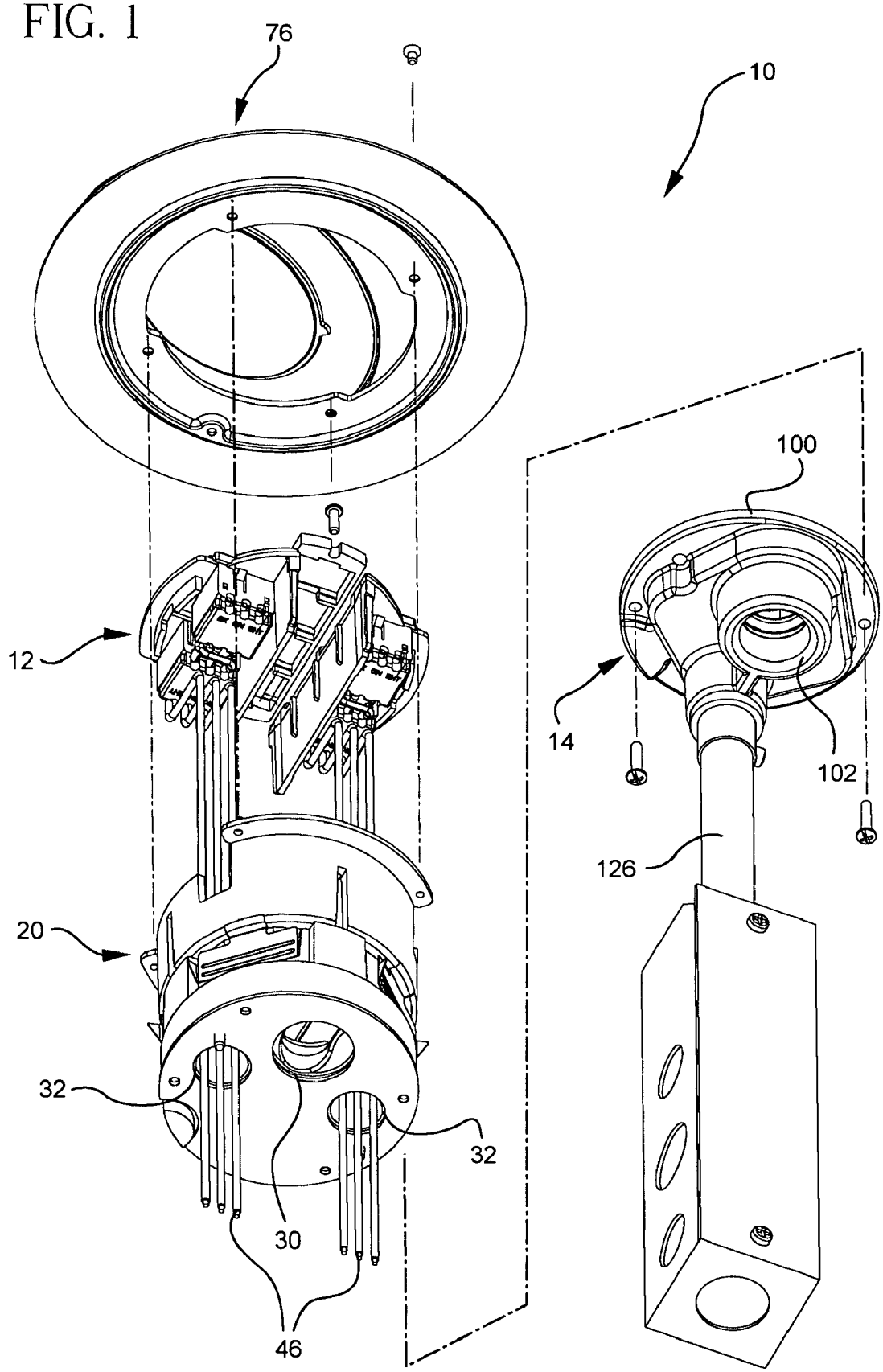
FIG. 1 is a bottom exploded perspective view of one embodiment of the poke-through insert of the present invention with a cover assembly, conduit structures and wiring.
Figure 2:
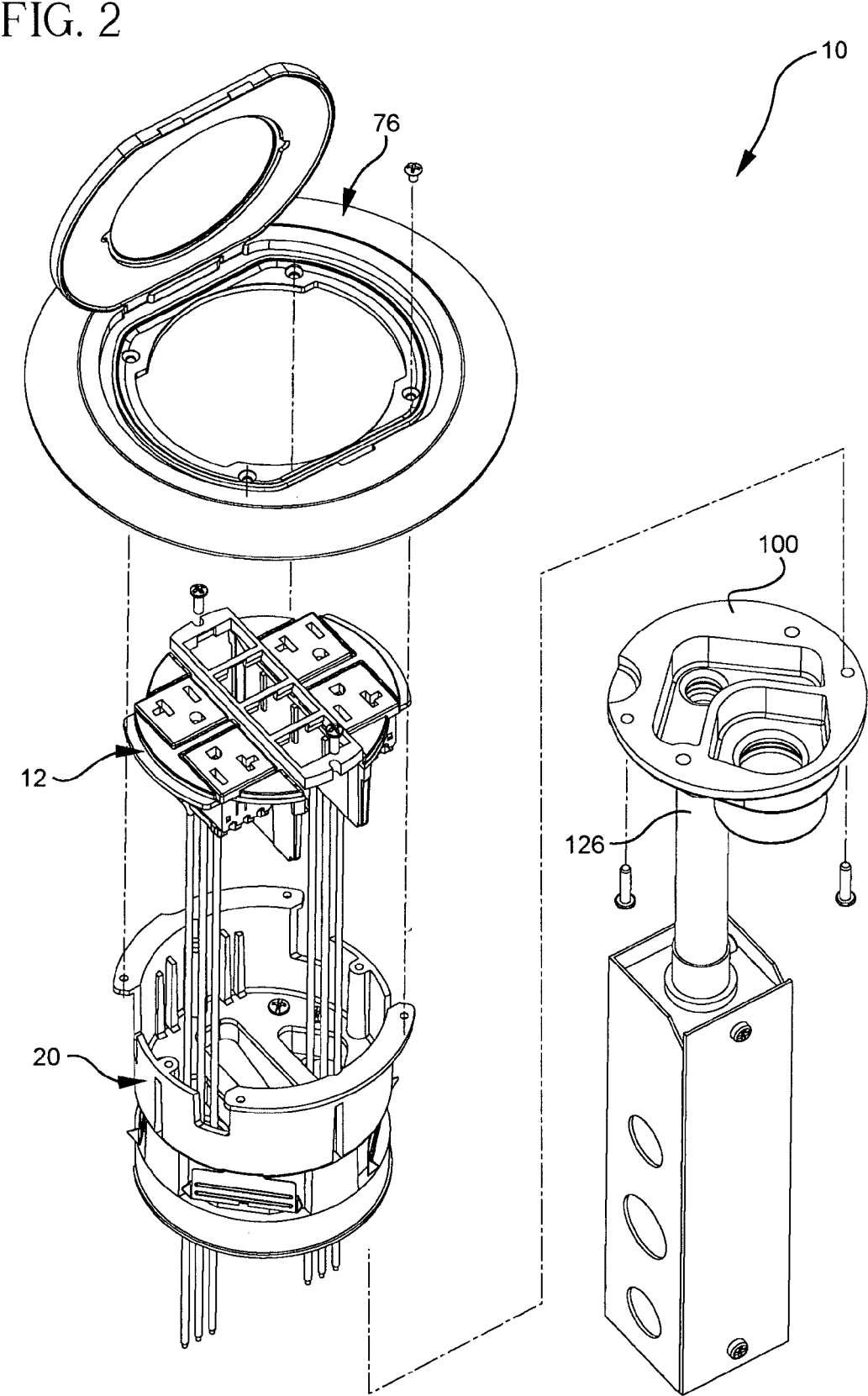
FIG. 2 is a top exploded perspective view similar to FIG. 1.

This invention pertains to a poke-through device that provides a conduit through a floor of a building and more particularly to a modular poke-through assembly that allows interchangeability of parts either during assembly or in the field to accommodate a variety of types and combinations of electrical, data and custom connectors. The invention, in its broadest sense, pertains to a poke-through device that can be readily adapted to a variety of different connectors including power, data, and special connectors tailored to the end user's need. Accordingly, the manufacturer and/or assembler may 'mix and match' various modular components to construct a poke-through that fits the current need. Such modularity further enables the installer and end-user to likewise make changes to the poke-through as such need may arise, for example, during construction or subsequent renovation of the building containing the poke-through.

Such modularity and flexibility enables the manufacturer and/or assembler to make last-minute changes to the requirements of a poke-through without having to re-build a whole separate unit and/or scrap the earlier one. In addition, if changes need to be made during installation, the modularity of the poke-through enables the change to be accommodated in the field by the installer or end-user, obviating the need to return the device to the manufacturer. Also, if the service needs of an installed poke-through change, for example, due to building renovations, the modularity of the poke-through of the present invention enables the necessary changes to be made without complete removal and replacement of the old poke-through. Therefore, the cost and disruption of altering the requirements of an installed poke-through are advantageously minimized.

FIGS. 1-12 show several embodiments of a poke-through 10 formed in accordance with the present invention. Each embodiment encompasses a different connector configuration and/or a different wiring configuration. The various combinations are achieved using modular, interchangeable connector supports and plates to pass data and/or power wires from upper connectors 12 to lower mounting cap(s) 14.

Preferably, the poke-through device 10 includes a body 20, which is configured for interchangeability of any of the modular connector components. Referring particularly to FIG. 13, and FIGS. 14a-c, body 20 includes fire/smoke retardation or intumescent member 22, also referred to herein as fire stop 22. Fire stop 22 is bounded on its lower side 35 by bottom plate 24 and on its upper side 34 by a receptacle-receiving basket 26. The three components are preferably held together via screws as shown. Additionally, a protrusion that forms an alignment tab 23 is included on fire stop 22. The alignment tab 23 preferably aligns with cut-out 31 in bottom plate 24 as well as the cut-out or recessed portion 110 in the mounting cap 14. In addition, retainer barbs 28 can be included to help secure body 20, and, subsequently, poke-through 10, within an opening in a floor.

Figure 13:
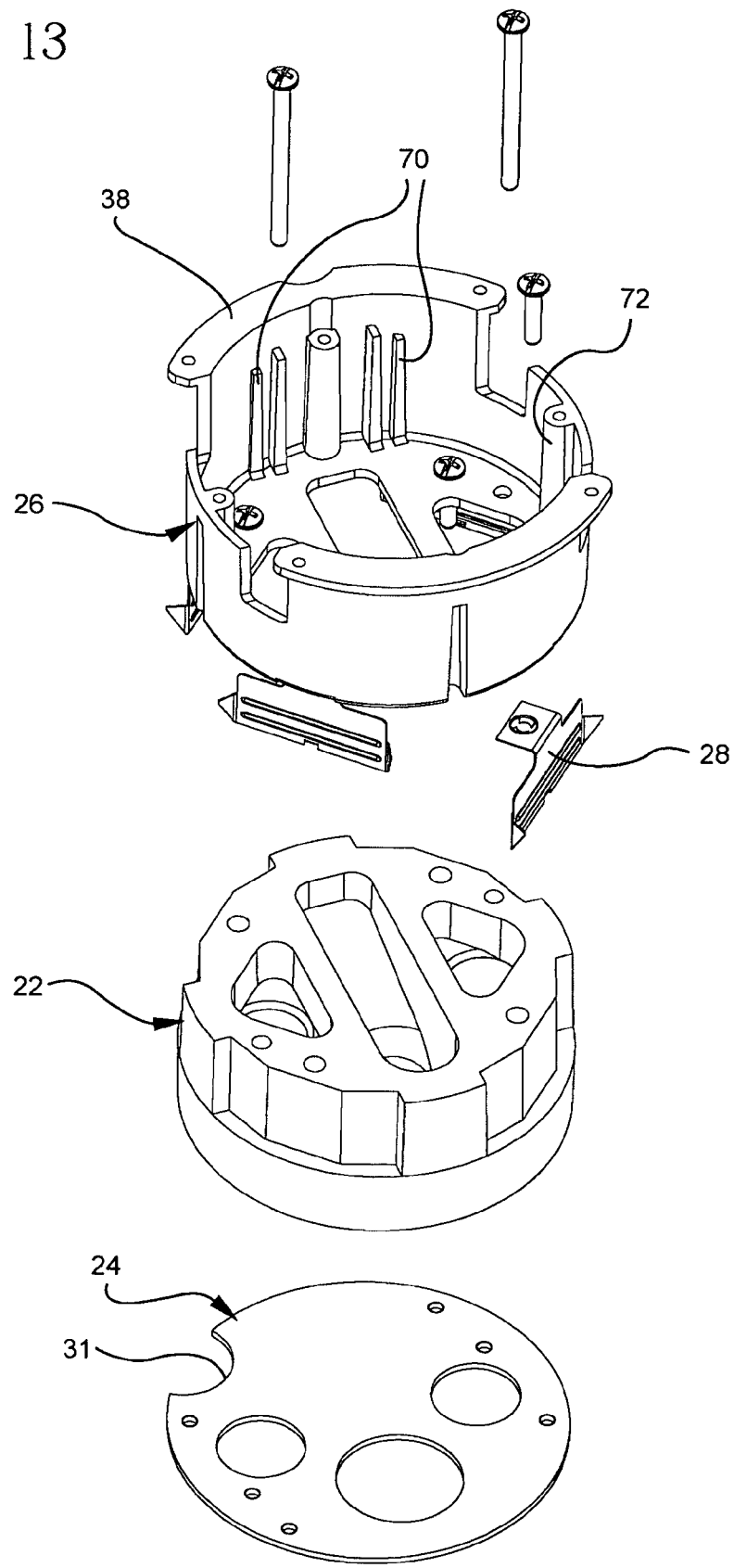
FIG. 13 is a top exploded perspective view of a basket, heat resistant member, bottom plate and related assembly elements in accordance with one embodiment of the present invention.
Figure 15A:
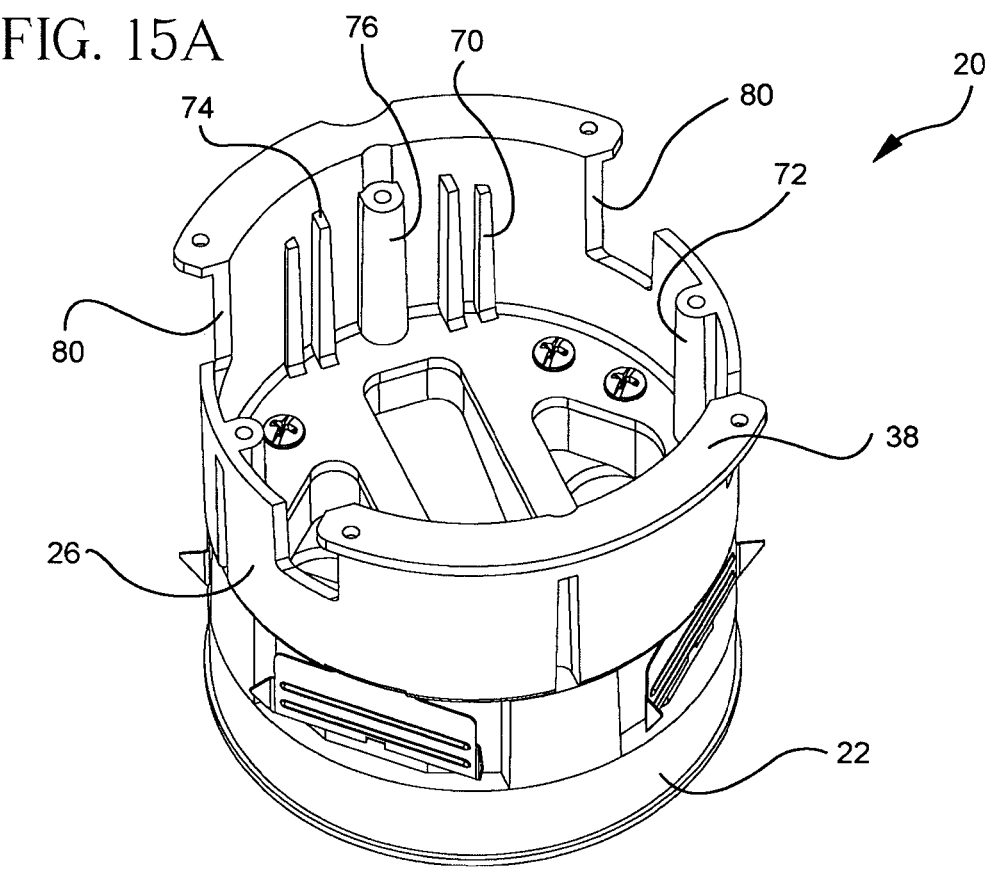
FIG. 15a is a top perspective assembled view of the assembly shown in FIG. 13.

Referring to FIGS. 13 and 15a, the basket 26 is made to receive the various connector supporting brackets or components. While the basket 26 shown forms a cup-like member, with various openings and cutouts, it should be understood that this element could have many variations known in the art. For example, the peripheral side walls of the basket 26 need not be continuous, but preferably cover a substantial portion of the floor hole in which it is installed. Similarly, fewer or additional openings or cutouts could be provided. Additionally, while the basket 26 can be made of various materials, it is preferably made of die-cast zinc or aluminum.

Referring to FIGS. 13 and 14a-c, the fire stop 22 is configured with a series of passageways therethrough. Larger opening 30 is preferably for passing data wires while the pair of smaller openings 32 can be used for either power or data feed, depending on how poke-through 10 is configured. The upper surface or top 34 of fire stop 22 is configured with cavities 36 therein that are designed to accommodate the bending of any wires that extend through feed openings 30 or 32, and which terminate at corresponding connectors.

Referring to FIGS. 15a-15f, several different modular connector components and configurations are shown (FIGS. 15b-15f) for interchangeably securing to the body 20 of FIG. 15a. Regardless of the connector configuration selected, each modular component is secured to body 20 (FIG. 15a) according to any means known to those skilled in the art, such as by screws or the like. Accordingly, regardless of the final connector configuration, each embodiment of the poke-through 10 of the present invention shares the body 20, to which a particular connector support(s) having one or more connector plates is removably secured. To change the final connector configuration at any time, the poke-through 10 only needs be modified for the particular connector support, plate, and/or individual connectors being interchanged or added. As shown in the exemplary embodiments of FIGS. 15b-15f, different connector configurations may require different supporting structures in order to be secured to body 20 and, in particular, to basket 26.

Figure 15B:
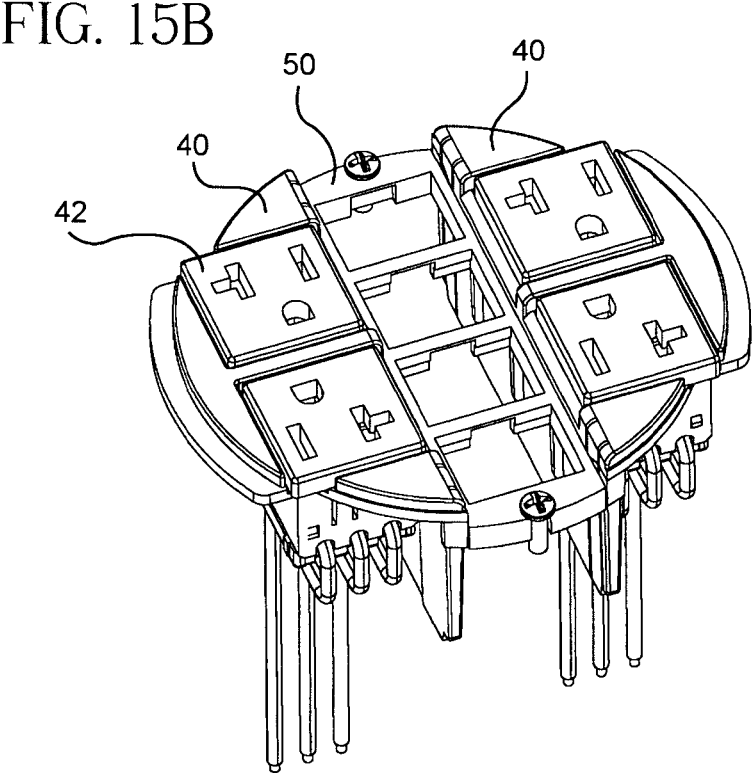
FIG. 15b is a top perspective view showing two power brackets each holding duplex connectors with wiring and a center data plate in accordance with the present invention.
Figure 19:
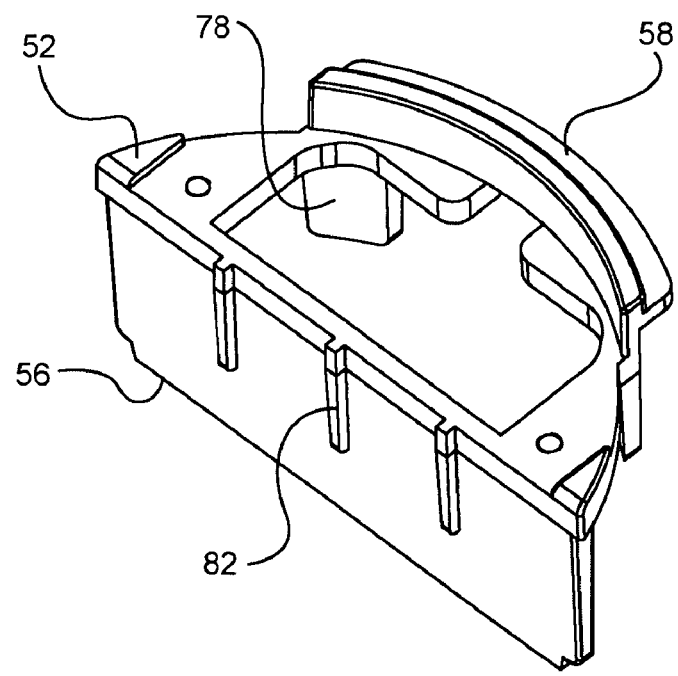
FIG. 19 is perspective views of a data bracket in accordance with the present invention.
Figure 20:
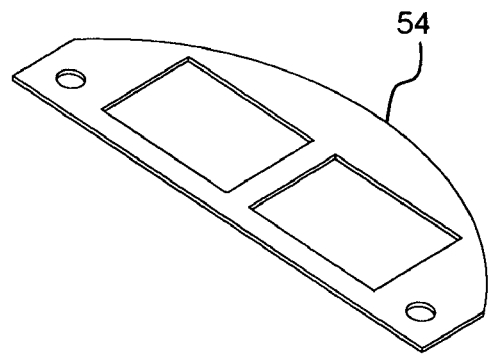
FIG. 20 is a perspective view of a side data plate in accordance with the present invention.
Figure 21:
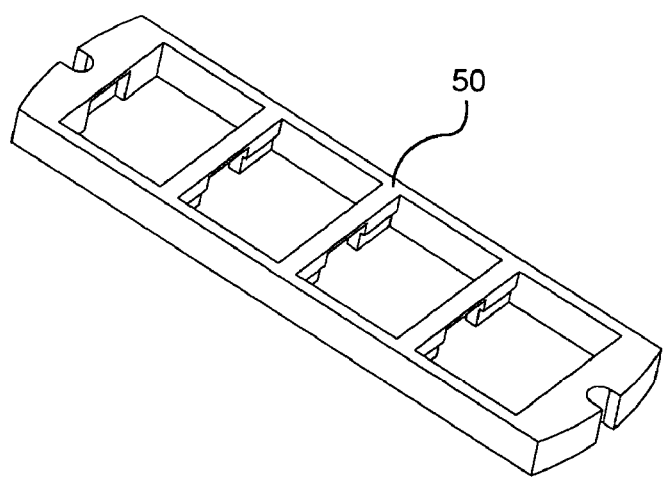
FIG. 21 is a perspective view of a center data plate in accordance with the present invention.

Various supporting structures and connector plates are shown in greater detail in FIGS. 16-24. It is understood, however, that the present invention is not limited to the exemplary supporting structures and plates shown. One or more of the same or different supporting structures can be combined together and secured to body 20 ('mix or match') in various configurations. For example, the embodiment shown in FIGS. 15b, 16, 17, 18 includes connector supporting brackets in the form of two duplex holders 40, which preferably secure to body 20. Each duplex holder 40 accommodates a pair of power outlets 42 that preferably individually snap-fit into duplex holder 40. Intermediate to the duplex holders 40 shown in FIG. 15b is center data plate 50, which is configured to hold typical data connectors therein, as shown in FIG. 21. Each duplex holder 40 is preferably configured with a depending wall section 44 that extends all the way to the bottom of basket 26. This wall section 44 separates power wires 46 from data wires running to center data plate 50.

Figure 15C:
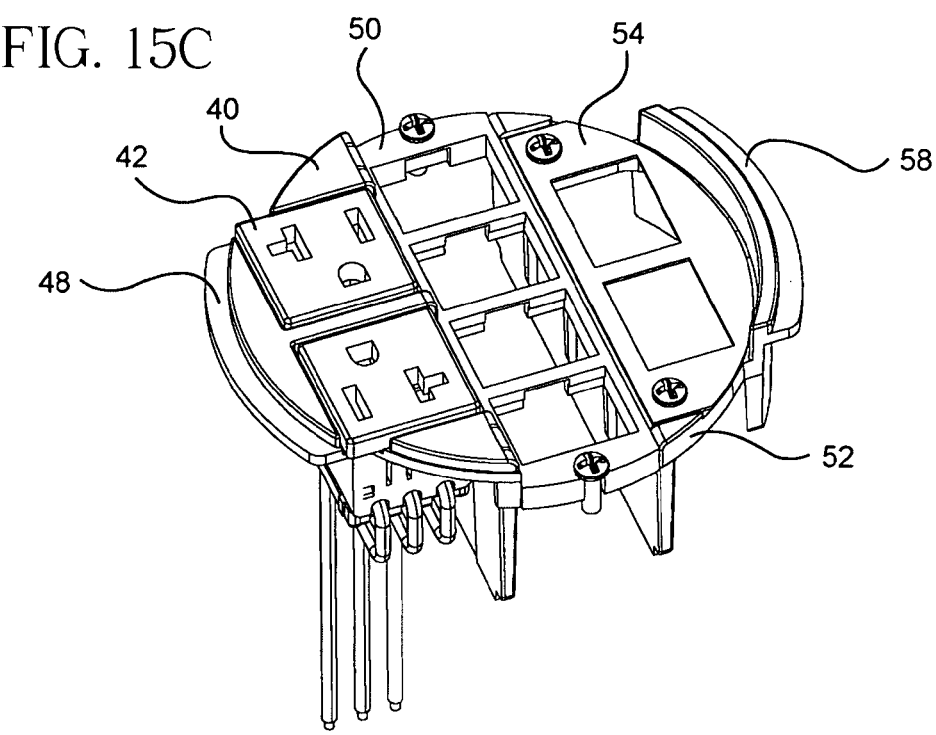
FIG. 15c is a top perspective view showing one power bracket holding a duplex connector with wiring, a center data plate, and a side data bracket with side data plate, in accordance with the present invention.
Figure 15D:
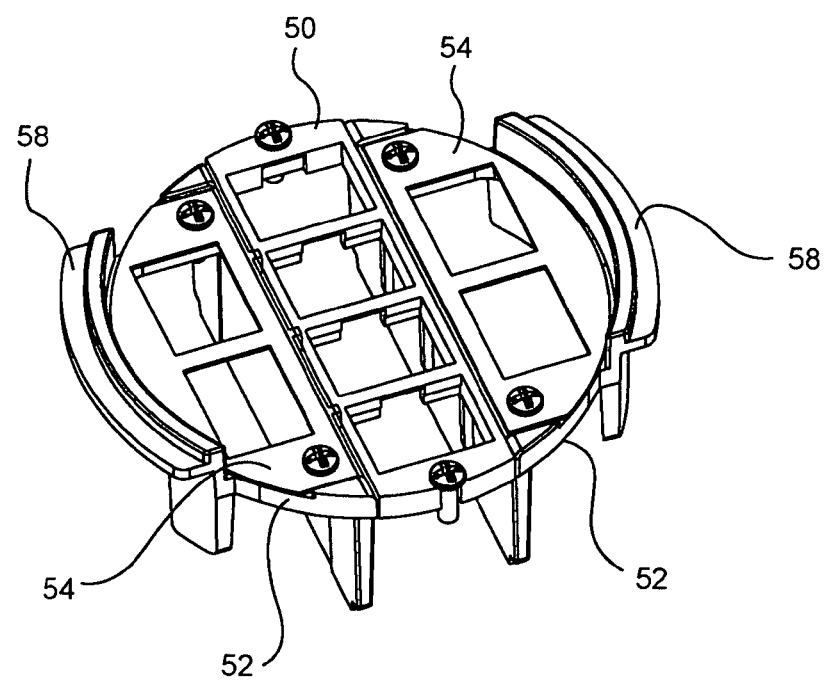
FIG. 15d is a top perspective view showing two data brackets each with a side data plate and a center data plate in accordance with the present invention.
Figure 15E:
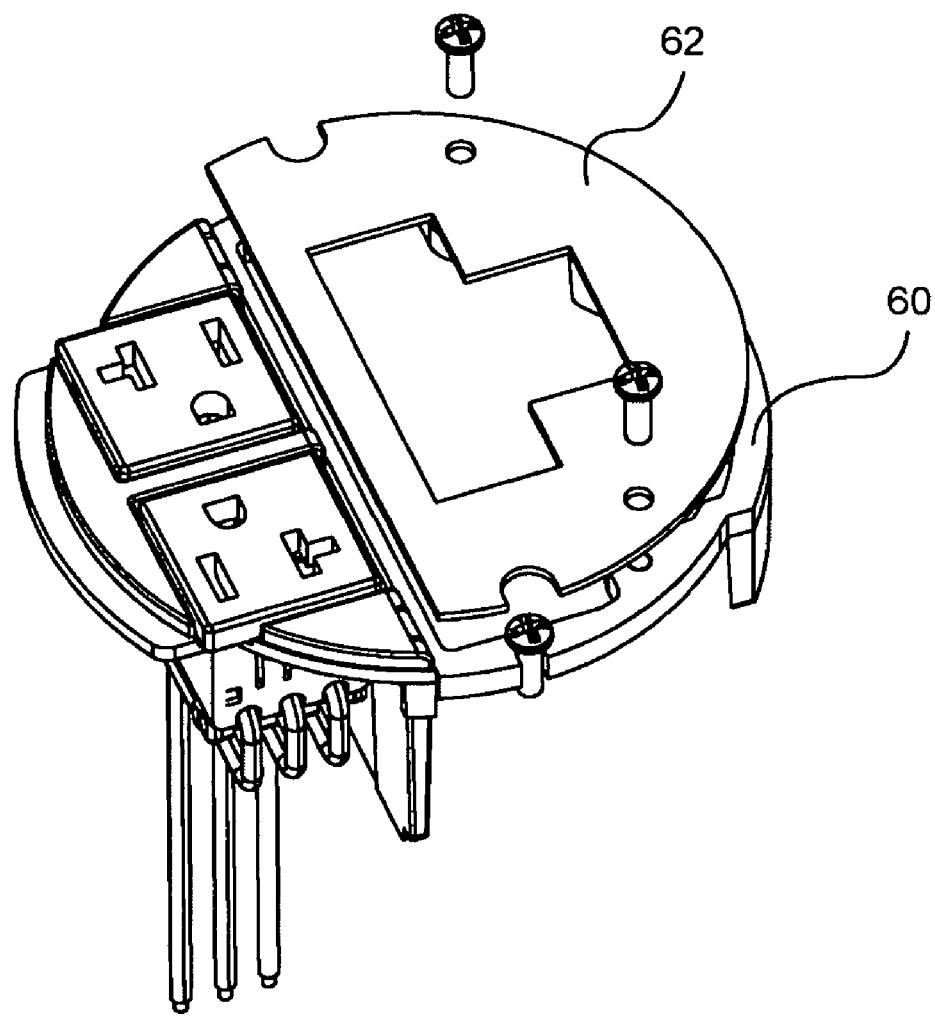
FIG. 15e is a top perspective view showing one power bracket holding a duplex connector with wiring, and an alternate bracket with an alternate support plate, in accordance with the present invention.
Figure 16:
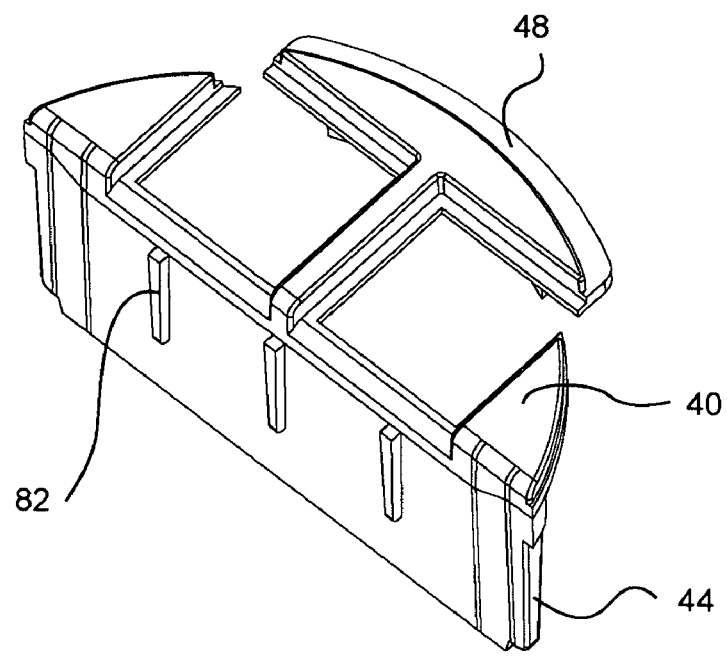
FIG. 16 is a top perspective view of a power bracket in accordance with the present invention.
Figure 17:
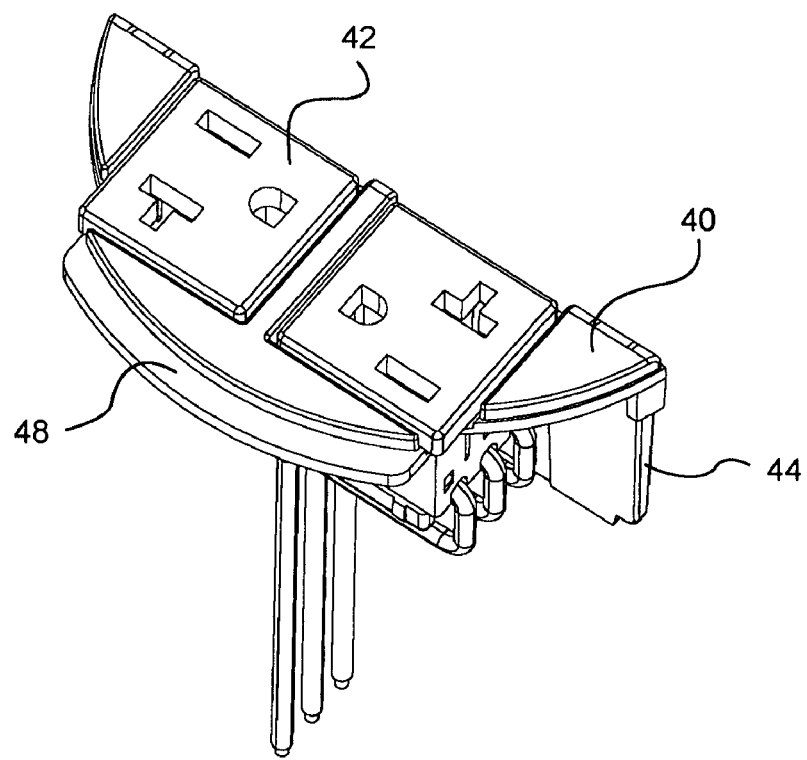
FIG. 17 is a reverse top perspective view of the power bracket of FIG. 16 holding a duplex connector, in accordance with the present invention.
Figure 18:
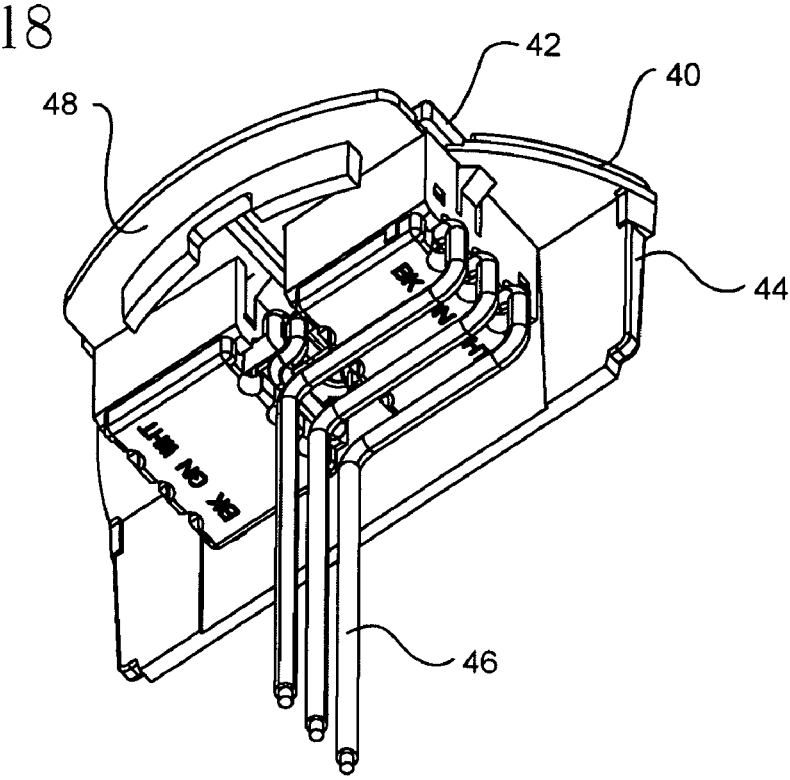
FIG. 18 is a bottom perspective view the assembly of FIG. 17.

FIGS. 15c-15e show the use of holder 40 and other brackets 50, 52, 60. In the embodiment shown in FIG. 15c, the duplex holder 40 is secured to the body 20, along with data holder 52 shown in FIG. 19. Data holder 52 is configured to support side data plate 54 as shown in FIG. 20. This side data plate 54 can be designed to hold the same or different data connectors than center data plate 50. As shown, side data plate 54 is preferably screw mounted to data holder 52. Data holder 52 is also preferably configured with a depending wall section 56 to provide rigidity. In a preferred embodiment, wall section 56 does not extend all the way to the bottom of basket 26, so that the data wires can extend underneath wall section 56 and run to either center data plate 50 or side data plate 54.

In another embodiment shown in FIG. 15d, a pair of data holders 52 having the same or different data plates 54 are secured in the body 20. These data holders 52 are, as shown, preferably positioned on opposite sides of center data plate 50, so that the user is provided with a multitude of data connectors to select from. Similar to the basket 26, the holders 40, 50, 52 and 60 are preferably made from die-cast zinc or aluminum.

Figure 22:
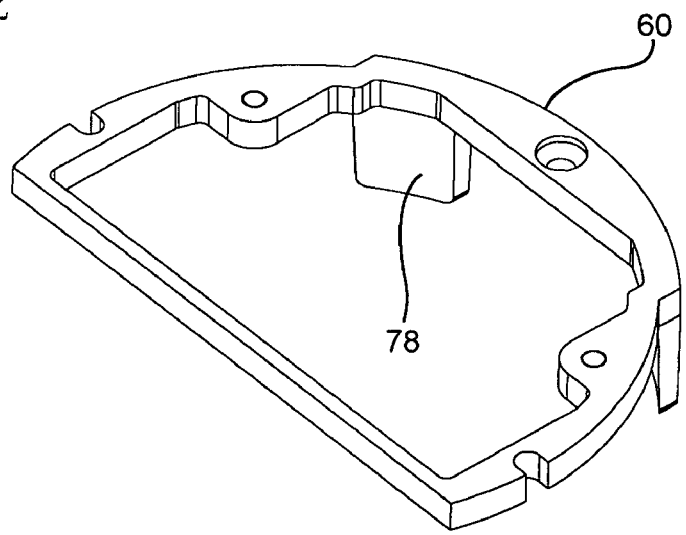
FIG. 22 is a perspective view of an alternative bracket in accordance with the present invention.
Figure 23:
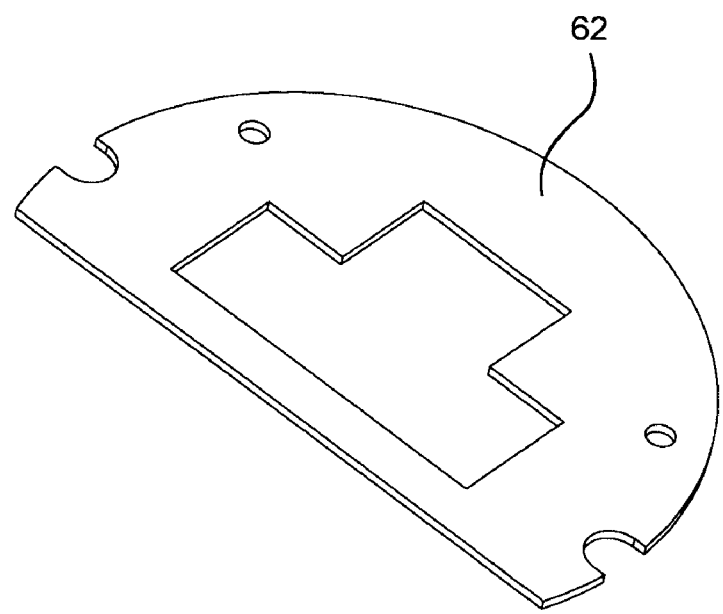
FIG. 23 is a perspective view of an alternative support plate in accordance with the present invention.

Referring to FIG. 15e, yet another embodiment of the poke-through of the present invention includes the data holder 60 shown individually in FIG. 22, along with special data plate 62 shown individually in FIG. 23, which can be removeably secured to the body 20. The special data plate 62 can be configured to accommodate any special requirement the end user may have. It will be appreciated that screws can also be threaded into both bosses 72 and 76 when data holder 60 is employed.

Each holder 40, 52 and 60 is preferably flush with or just slightly recessed within basket 26 of body 20. Referring to FIG. 15*a*, outer ribs 70 protrude from a side wall of basket 26. The underside of holders 40, 52 and 60 also preferably rest upon the top of these ribs 70 upon installation. These holders 40, 52, 60 are also preferably supported by appropriately located rib or boss 72. Additionally, another rib or boss 76 and a second set of ribs 74, which are interior of ribs 70, similarly protrude from the side wall of basket 26. Center data plate 50 preferably is supported by or rests upon the top of these other ribs 74, 76 within basket 26. It should be noted that the gap between ribs 70 and 74 forms a channel or slot. Thus, the dividing walls 44, 56 of the brackets 40, 52 fit therein to provide even further guidance and support for such holders and to further isolate power/data wires from the separated portion of the basket 26. Similarly, the dividing walls 44, 56 preferably include protruding central ribs 82. The center data plate 50 also preferably rests upon these central ribs 82 when their respective holders 40 or 52 are used. Alternatively, the channels or slots could be formed by one or more vertical grooves or recesses in the wall of the basket (not shown). A step (not shown) could thus be alternatively introduced to the inner portion of flange 38 to provide a support surface for the various brackets or plates discussed herein.

Basket 26 also preferably includes flanges 38. Similar flanges 48 and 58 are preferably located on each of holders 40 and 52, respectively. These flanges, 38, 48 and 58, become sandwiched between the floor material (i.e. concrete) and a cover 76 (FIG. 1) placed over poke-through 10 to provide even more support and rigidity to each of holders 40 and 52 along with basket 26.

Referring to FIGS. 19 and 22, data holders 52 and 60 are each preferably configured with vertical protrusions or tabs 78. These tabs 78 fit within mating recesses or cut-outs 80 in basket 26. Such mating elements can ensure proper alignment of parts as well as provide stability to the assembly.

Figure 24:
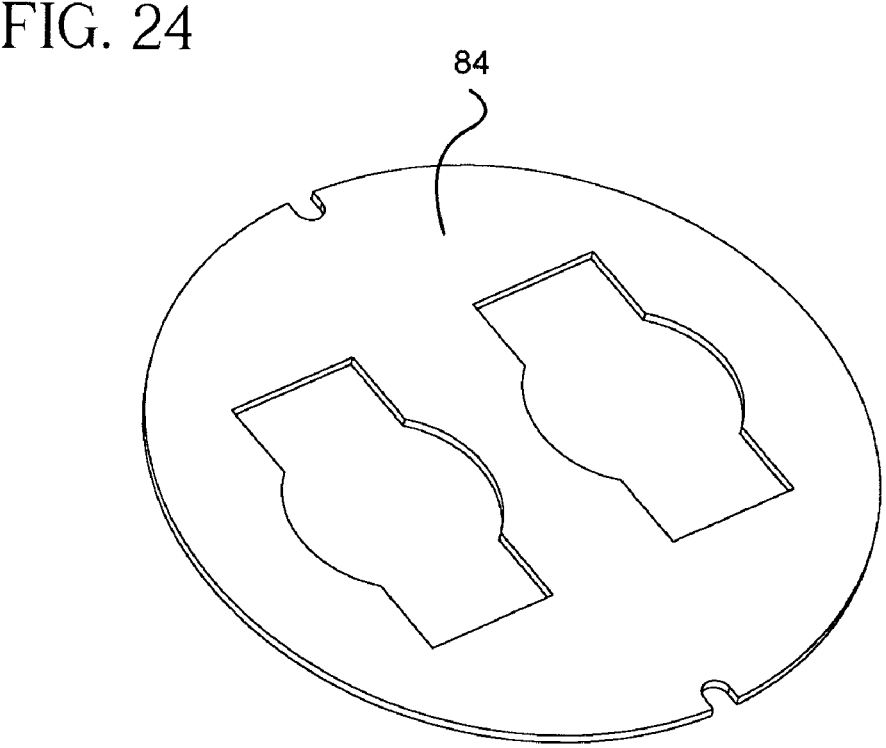
FIG. 24 is a perspective view of another alternative support plate in accordance with the present invention.

Referring now to FIG. 24, in one embodiment, a plate 84 is included for mounting a turn-lock or twist-lock or some other special connector type. In this embodiment, no accompanying holder 40, 52 or 60 is required to support the plate 84 as is needed for plates 54 and 62. Instead, plate 84 fits within basket 26 and preferably rests upon bosses 72 and 76, as well as on ribs 70 and 74. Plate 84 can be fastened to basket 26 via screws threaded into bosses 76 or by any other means known to those skilled in the art. It will be appreciated that screws can also be threaded into both bosses 72 and 76 when data holder 60 is employed. Plates 54, 62 and 84 are preferably made from galvanized steel. However, other materials may be used as are known in the art.

Accordingly, the poke-through 10 of the present invention via body 20 can interchangeably incorporate a variety of different combinations of data and power connectors. Each of these data or power connectors can be accessed individually (i.e. removed from its respective holder/plate) without the need to disassemble body 20 or otherwise separate the various components of the poke-through 10. In fact, each such connector can be worked on or re-wired or separated from its holder/plate without affecting any adjacent connector. In addition, the replacement and addition of connector components (i.e., connector supports, plates, and individual connectors) can be done from above poke-through 10, without removing the poke-through 10 from the floor.

In contrast to the conventional poke-through, the interchangeability of the connector supports and plates in the body 20 of the present poke-through 10 allows decisions to be made about the types of connectors to be installed at any time during the construction (or renovation) process. In other words, poke-through 10 is not limited after the manufacturing stage to just one type of connector or one type of connector configuration as are conventional poke-throughs. Instead, poke-through 10 provides the user with a much greater degree of design freedom, so that changes in the field, or even changes after installation, can be readily accommodated without having to order a new poke-through or undergo a major dis-assembly or re-wiring of the poke-through. Instead, if a change is desired with poke-through 10, the user only needs to remove the connector in question from its plate/holder (such as via a screwdriver). Then the new connector can be re-inserted, for example, by snapping it into its respective holder/plate. In some cases, it may be necessary to replace a plate or a holder (such as by removing one or more screws) if a whole new connector type is to be installed. Such modularity greatly simplifies the installation and the re-working of the poke-through 10 of the present invention in comparison to conventional poke-throughs, which typically must be replaced in their entirety in order to modify the connector configuration.

The poke-through 10 of the present invention also preferably includes one or more mounting caps 14, 100, 120, 122, 140. FIGS. 25-32 show various embodiments of the mounting cap 100, 120, 122, 140 of the present invention. Generally, the mounting cap 14, 100, 120, 122, 140 abuts bottom plate 24 and is secured to body 20. Preferably, the mounting cap 14, 100, 120, 122, 140 is made from cast iron, although other materials known in the art could be used.

Figure 3:
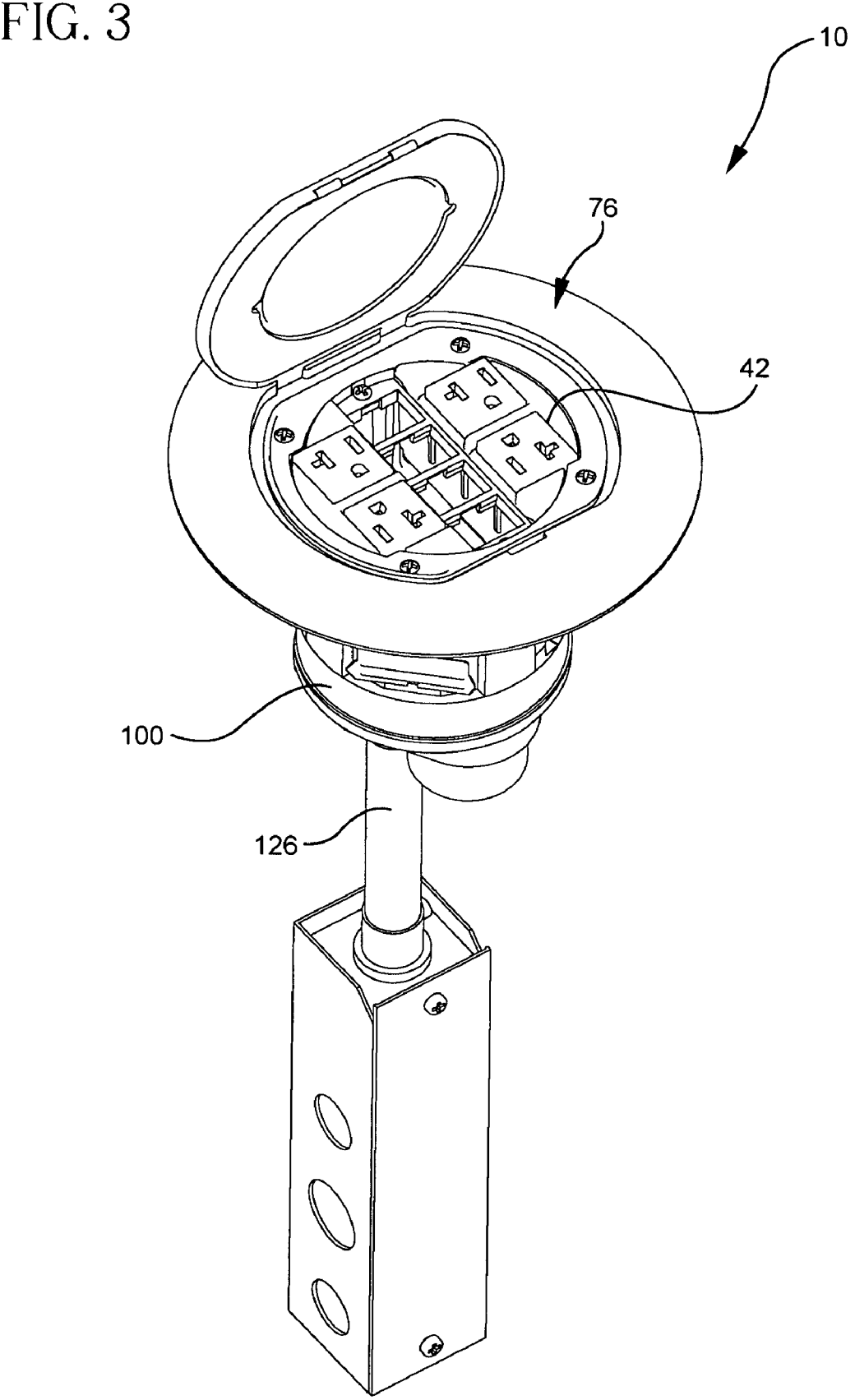
FIG. 3 is a top perspective assembled view of the overall assembly shown in FIG. 2.
Figure 4:
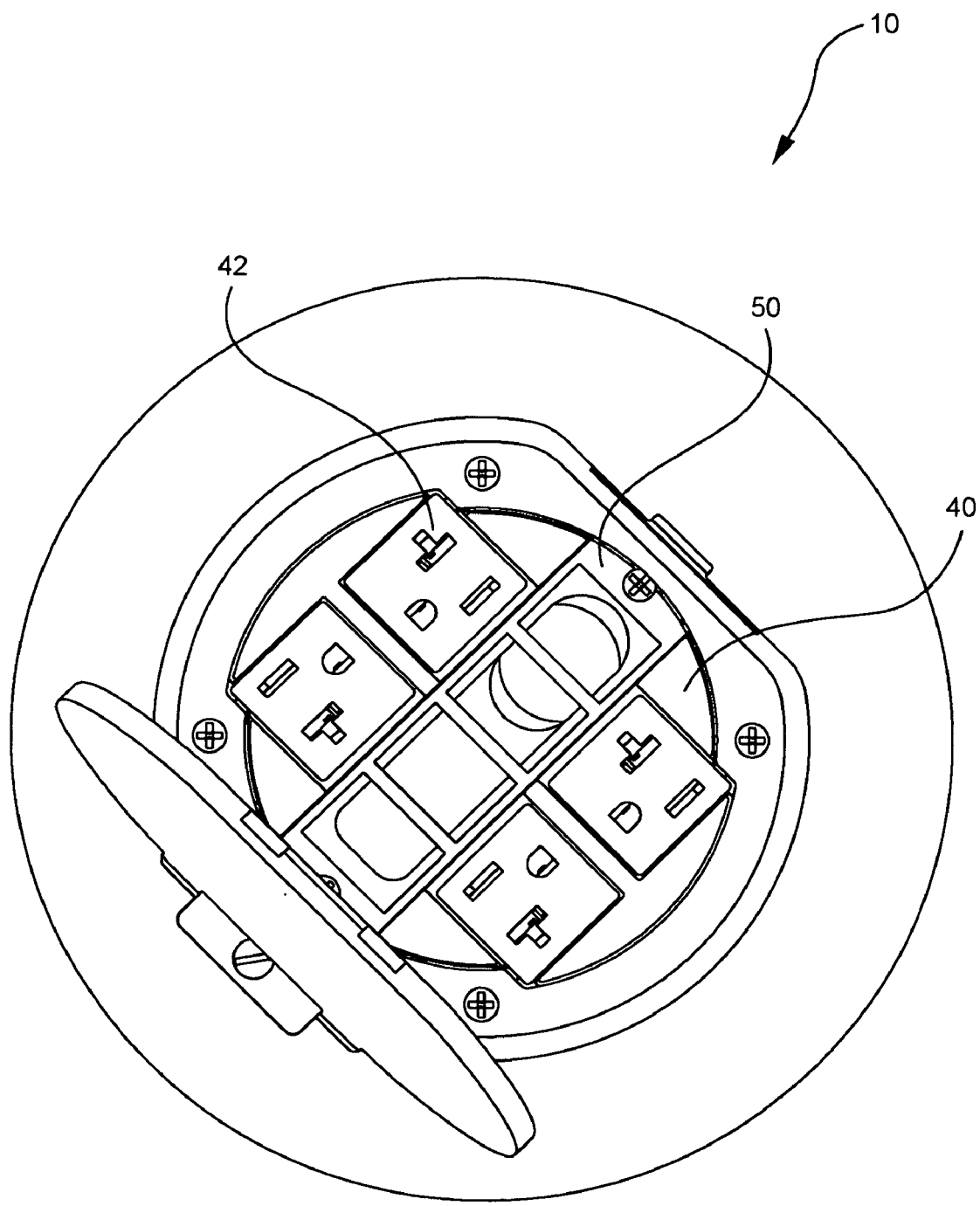
FIG. 4 is a top view of the embodiment of FIG. 1 with the cover assembly in the open position.
Figure 5:
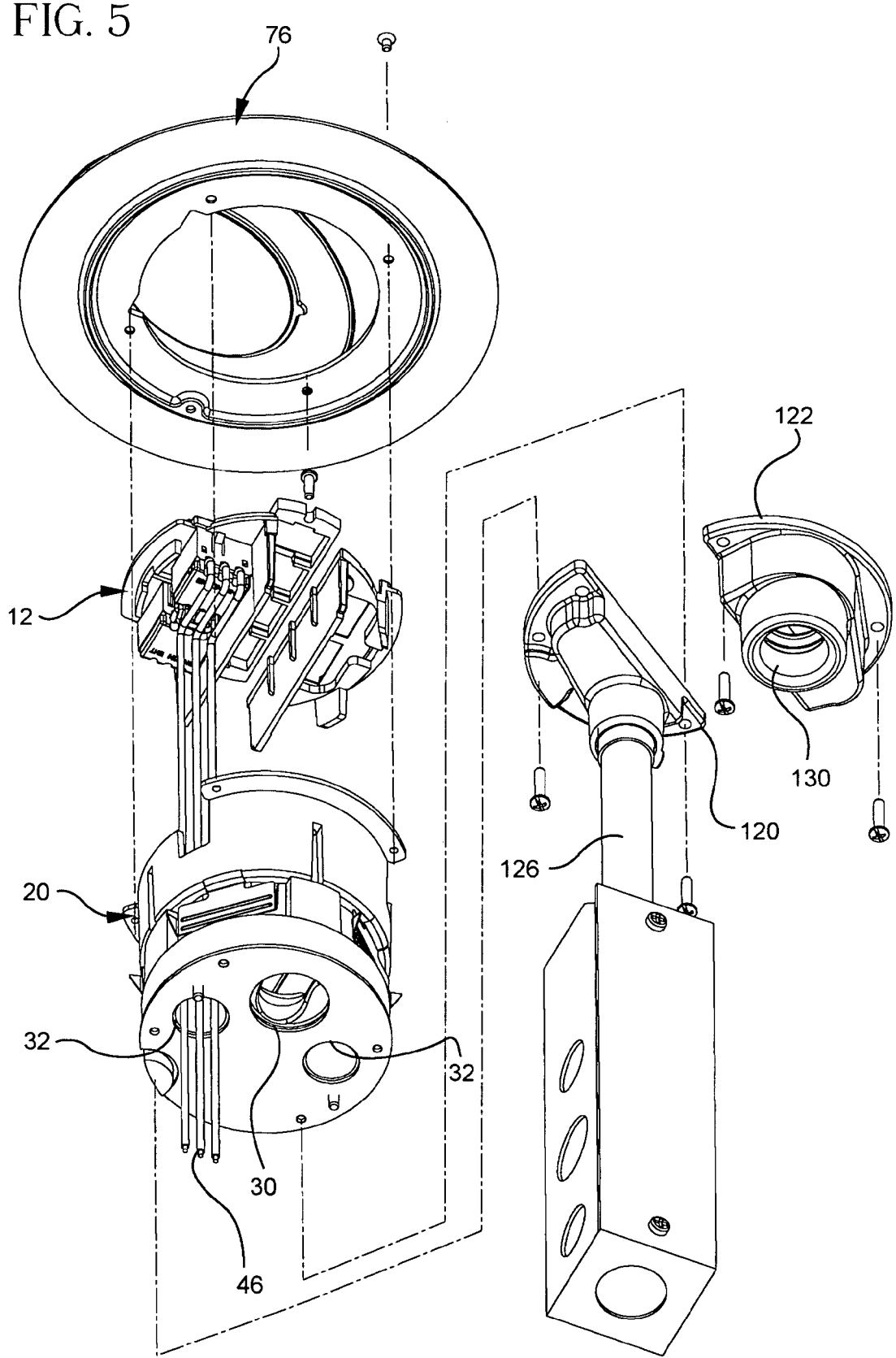
FIG. 5 is a bottom exploded perspective view of a second embodiment of the poke-through insert of the present invention with a cover assembly, conduit structures and wiring.
Figure 6:
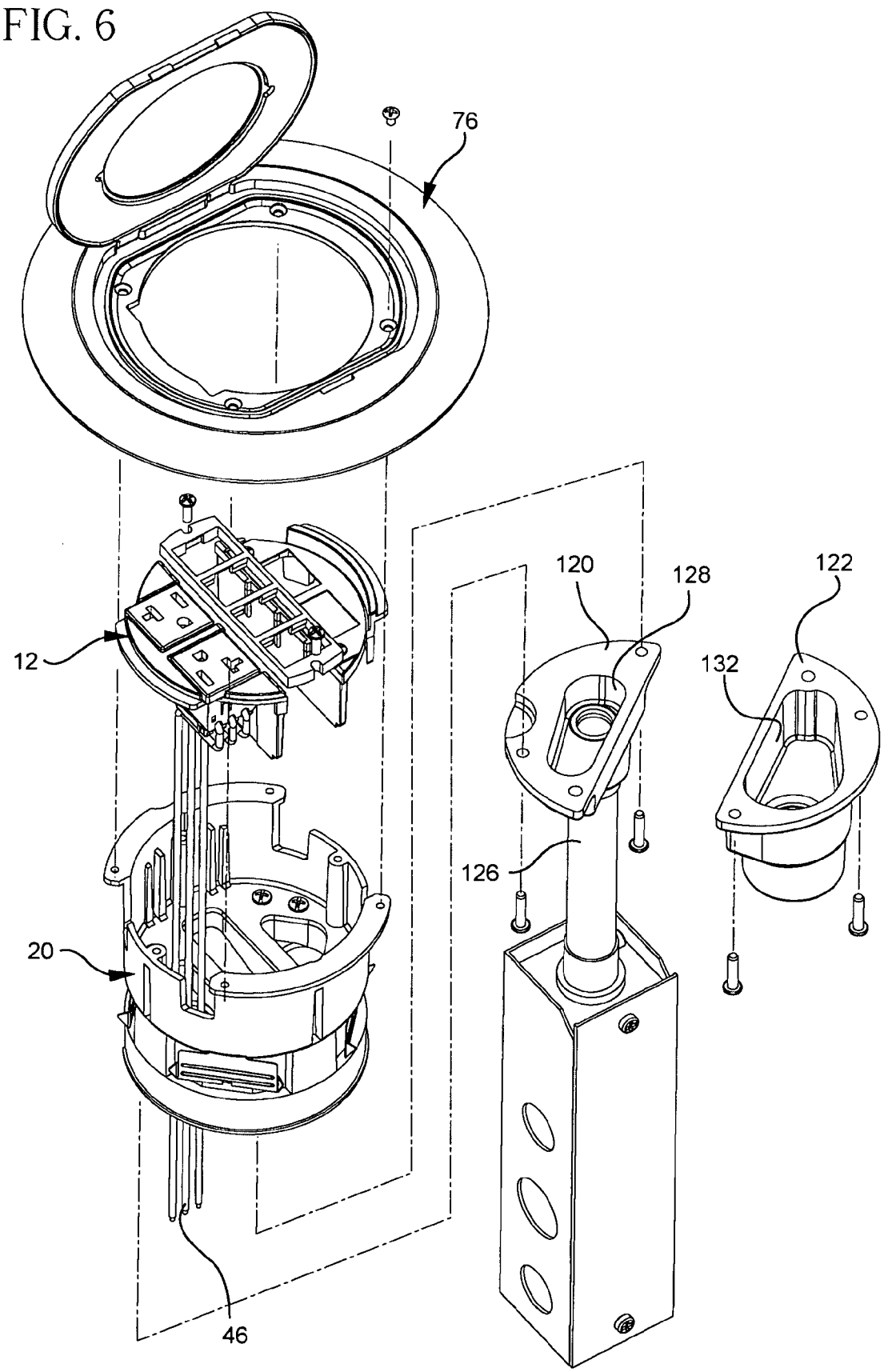
FIG. 6 is a top exploded perspective view similar to FIG. 5.
Figure 14A:
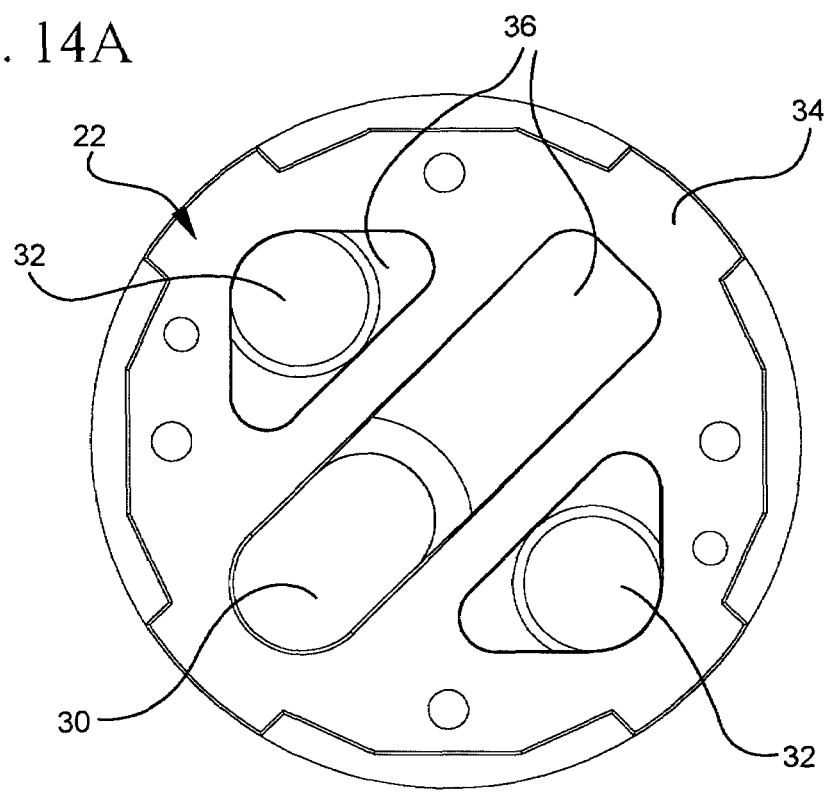
FIG. 14a is a top view of the heat resistant member shown in FIG. 13.
Figure 14B:
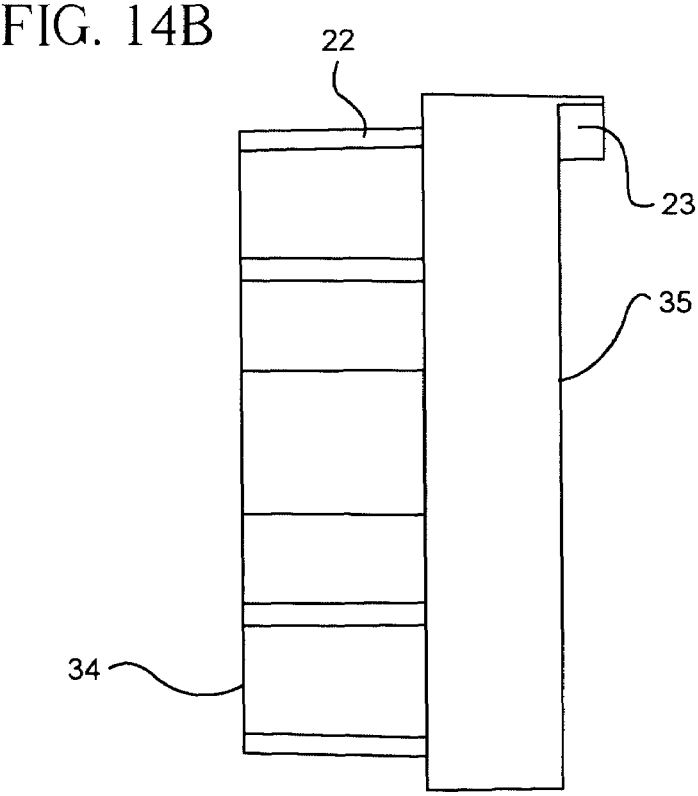
FIG. 14b is a side view of the heat resistant member shown in FIG. 13.
Figure 14C:
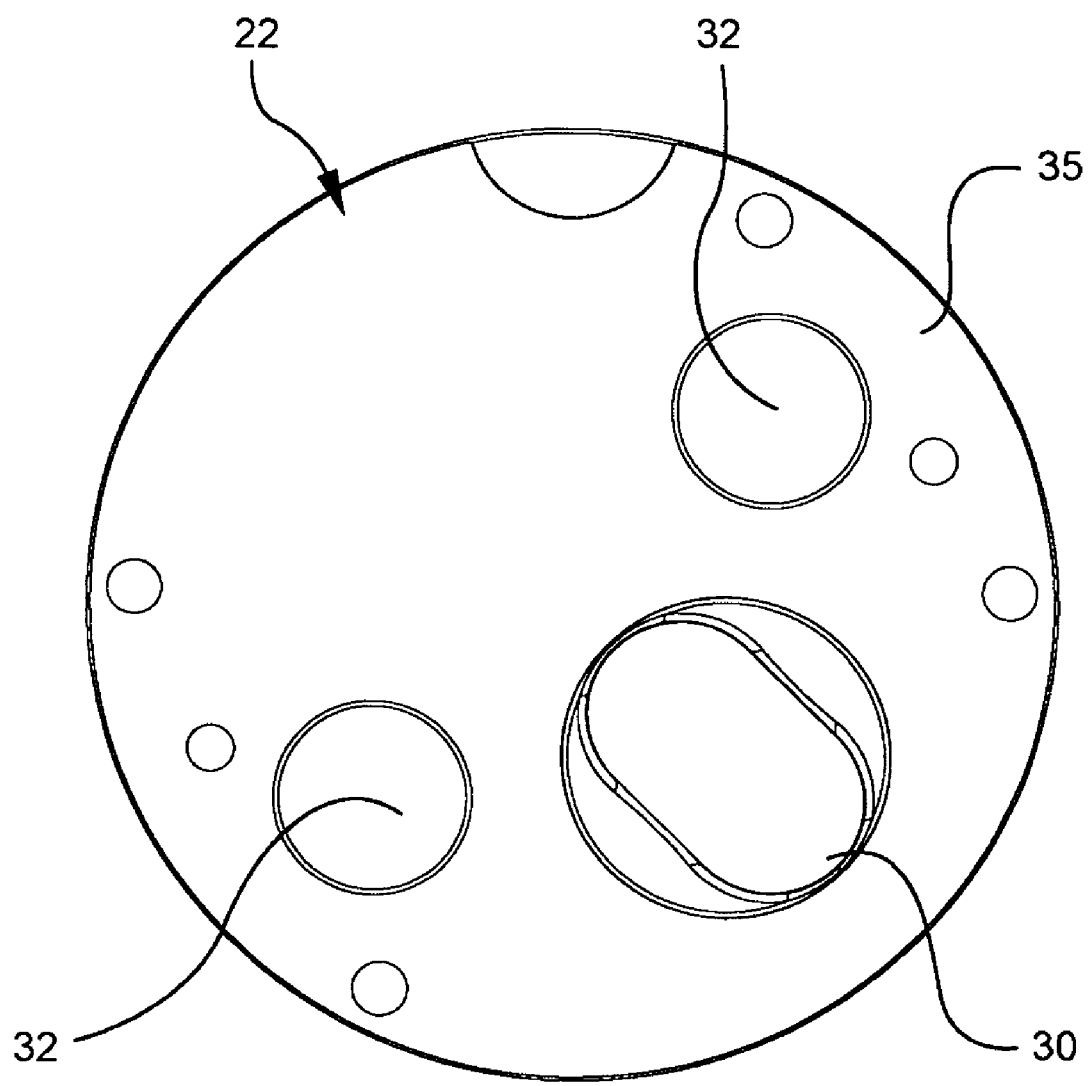
FIG. 14c is a bottom view of the heat resistant member shown in FIG. 13.
Figure 25:
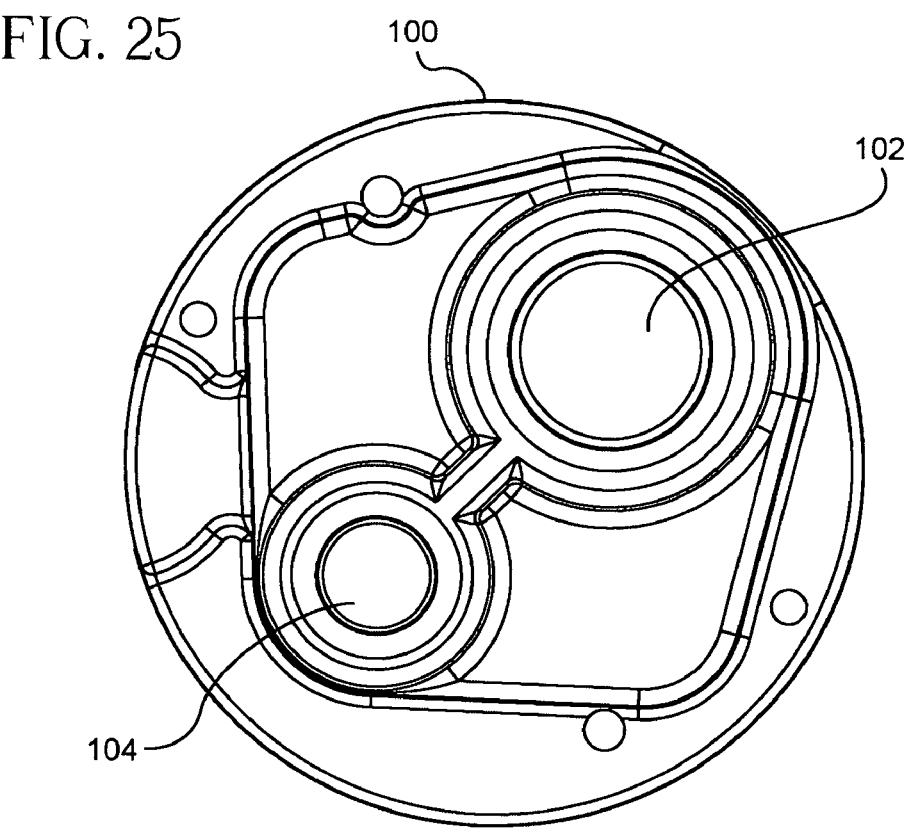
FIG. 25 is a bottom view of the mounting cap shown in FIG. 1.
Figure 26:
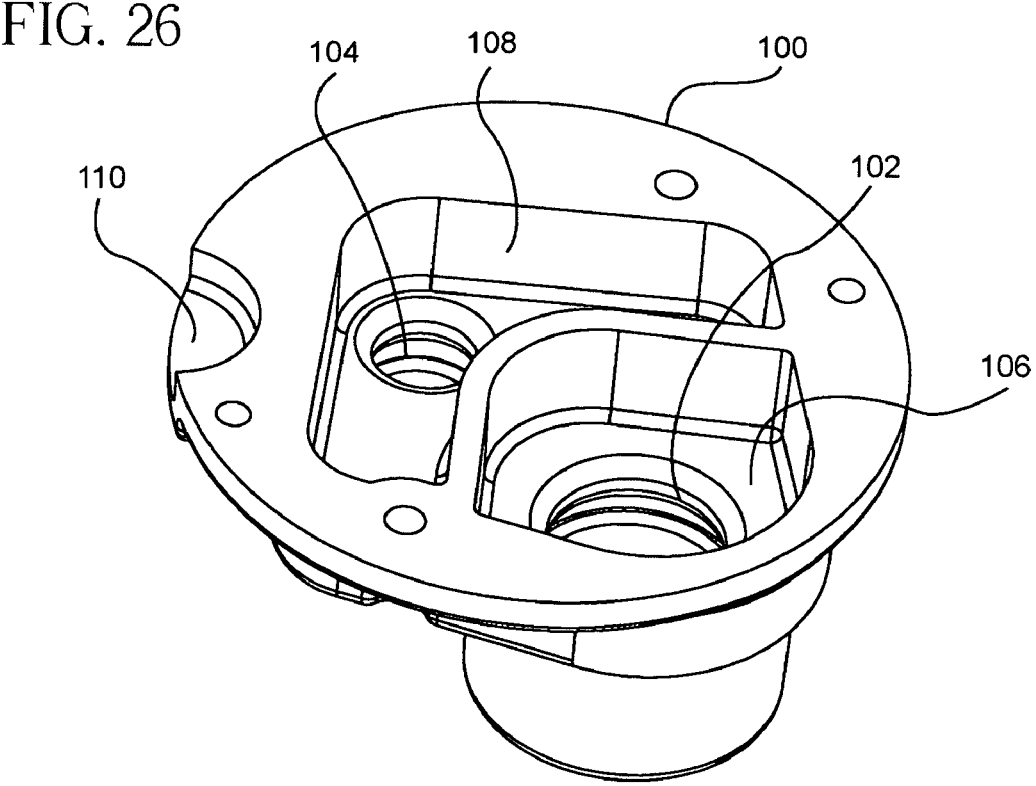
FIG. 26 is a top perspective view of the mounting cap shown in FIG. 1.
Figure 27:
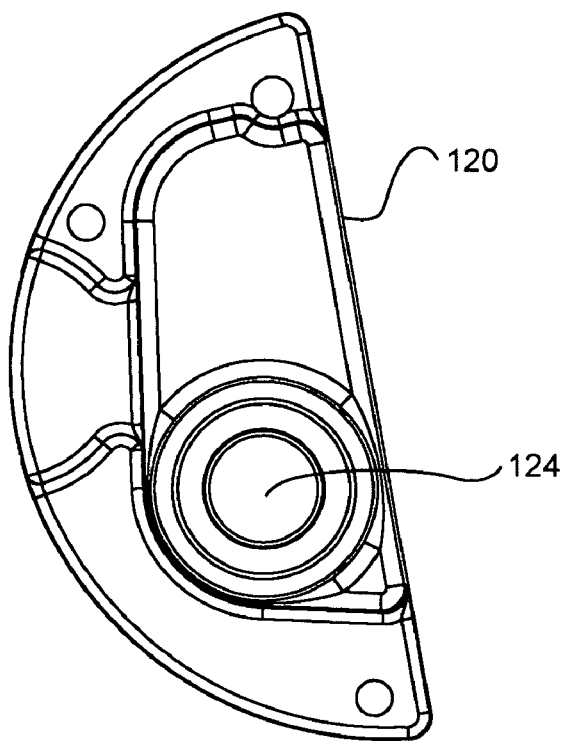
FIG. 27 is a bottom view of the left mounting cap shown in FIG. 5.
Figure 28:
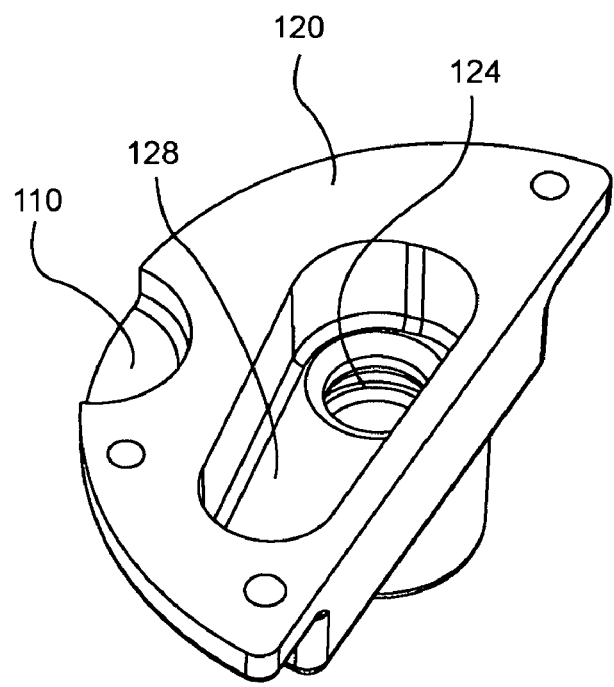
FIG. 28 is a top perspective view of the left mounting cap shown in FIG. 5.
Figure 29:
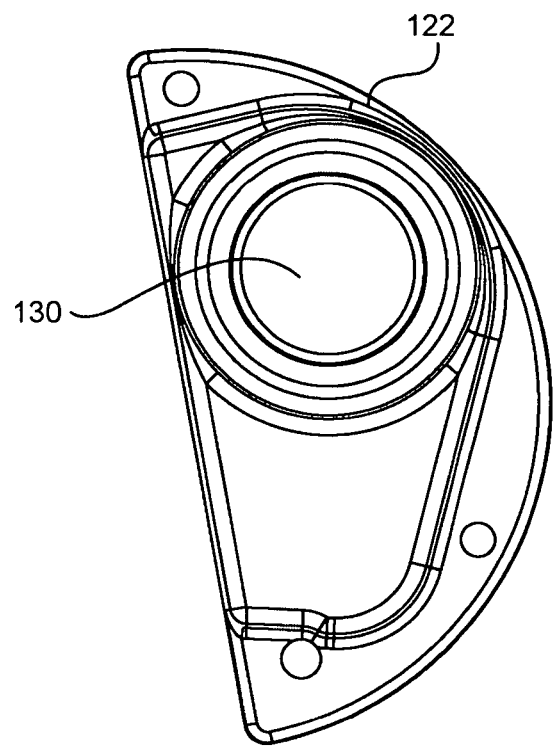
FIG. 29 is a bottom view of the right mounting cap shown in FIG. 5.
Figure 30:
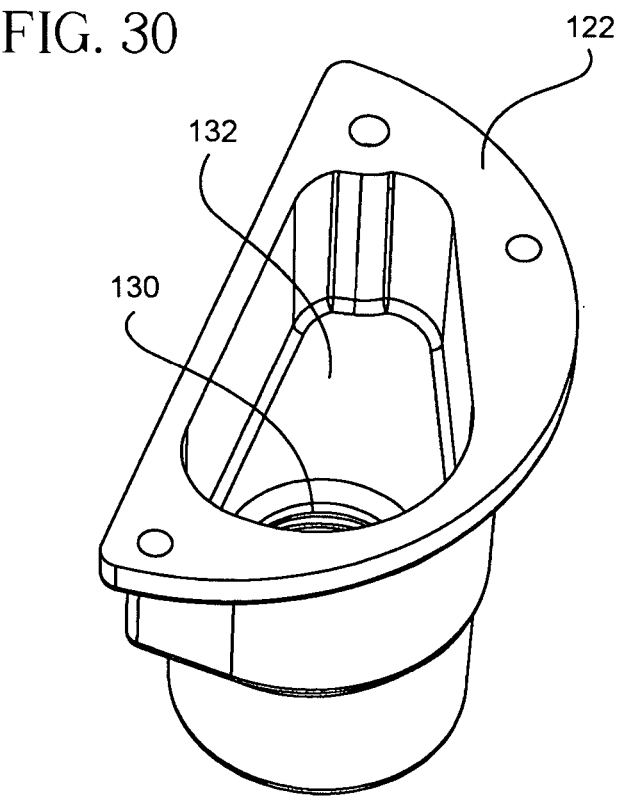
FIG. 30 is a top perspective view of the right mounting cap shown in FIG. 5.

One embodiment of the poke-through 10 of the present invention, as shown in FIG. 3, includes four power receptacles 42 and four data jacks mounted to center data plate 50. Preferably, this embodiment also includes the mounting cap 100 as shown in FIGS. 25 and 26. Mounting cap 100 is configured with data aperture 102 and power aperture 104. Each aperture 102, 104 is adjacent to a respective cavity or well 106 and 108 that provides an area where the respective data and power wires may be bent so as to align with feed openings 30 and 32 in fire stop 22 (FIGS. 14*a* and 14*b*). Because power receptacles 42 are to be located on both sides of this particular design of poke-through 10, well 108 is configured so that power wires 46 (FIGS. 1 and 2) can enter both feed through openings 32 in fire stop 22. Wells 106 and 108 remain separated from each other in order to maintain separation between the respective data and power wires. Power aperture 104 is preferably configured to be coupled to conduit 126 (FIGS. 1 and 2) by any appropriate means known to those skilled in the art.

Figure 7:
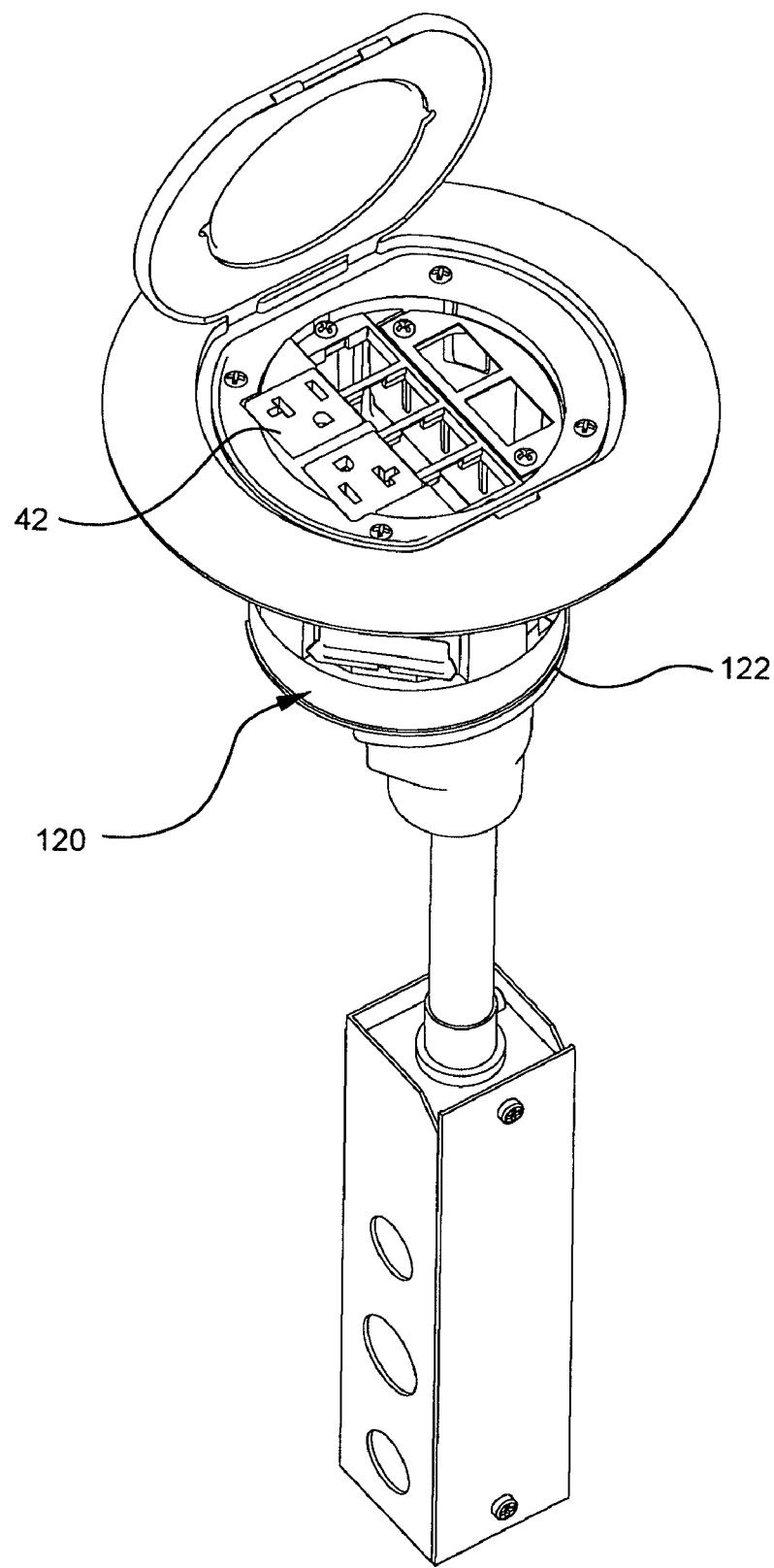
FIG. 7 is a top perspective assembled view of the overall assembly shown in FIG. 6.
Figure 8:
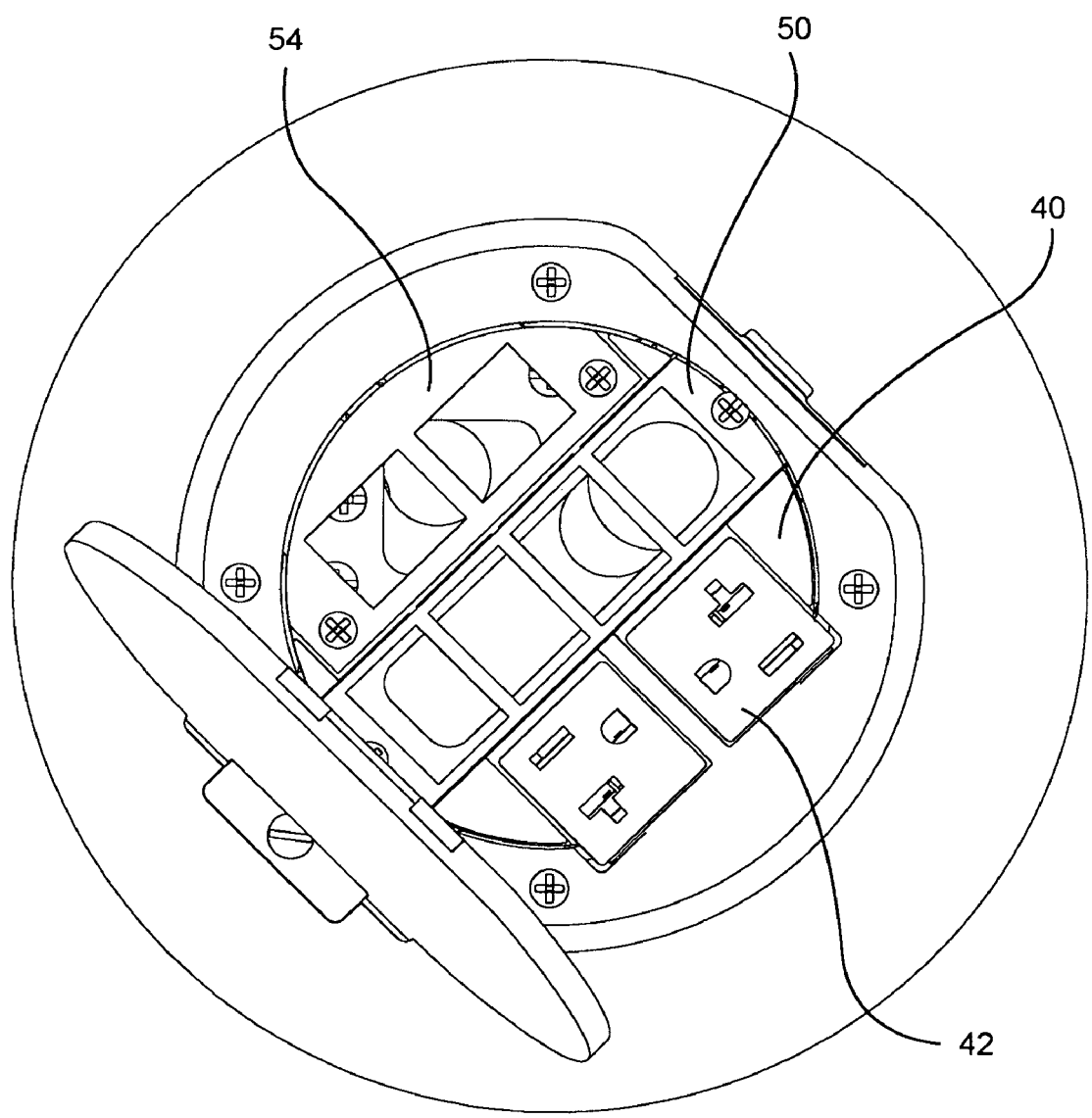
FIG. 8 is a top view of the embodiment of FIG. 5 with the cover assembly in the open position.
Figure 9:
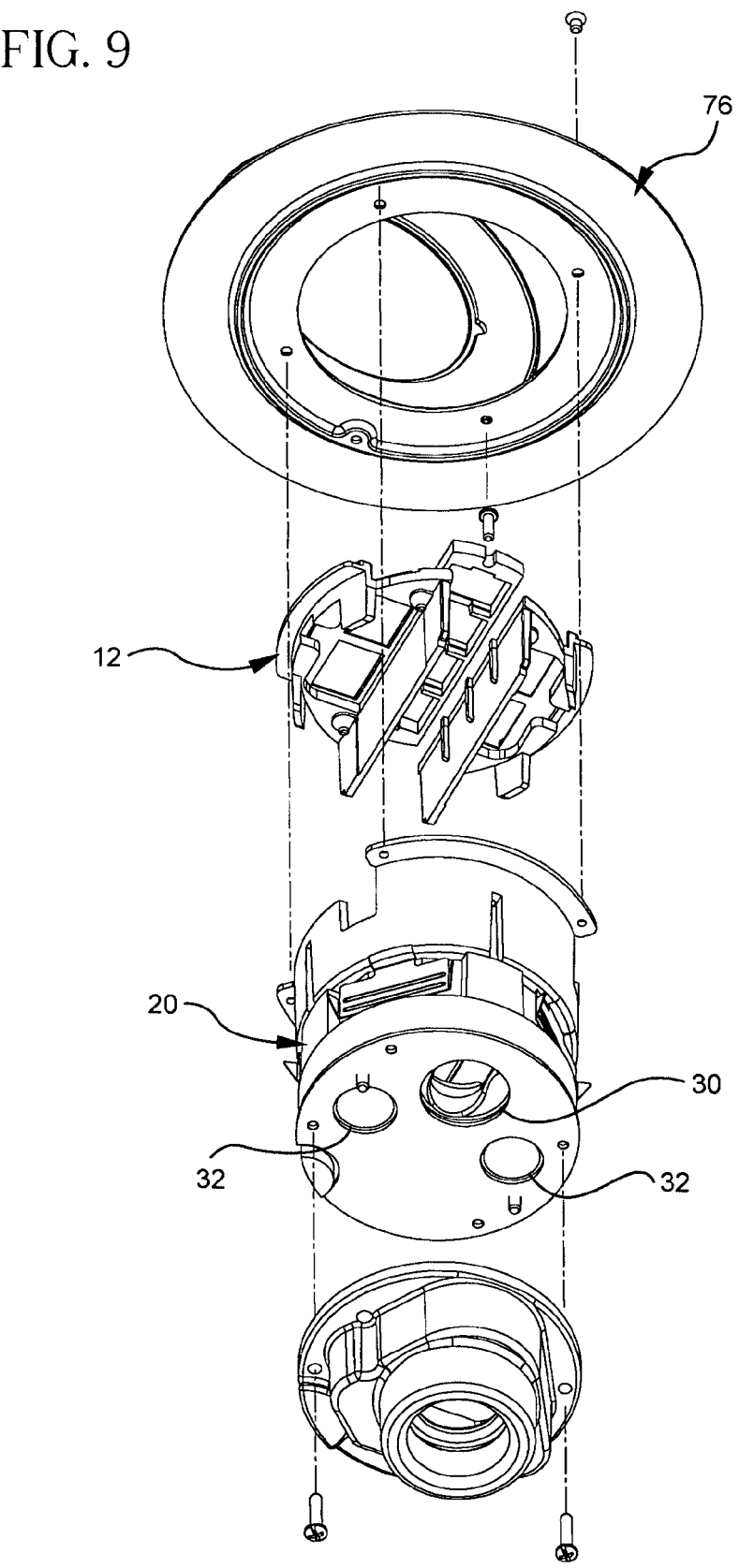
FIG. 9 is a bottom exploded perspective view of a third embodiment of the poke-through insert of the present invention with a cover assembly.
Figure 10:
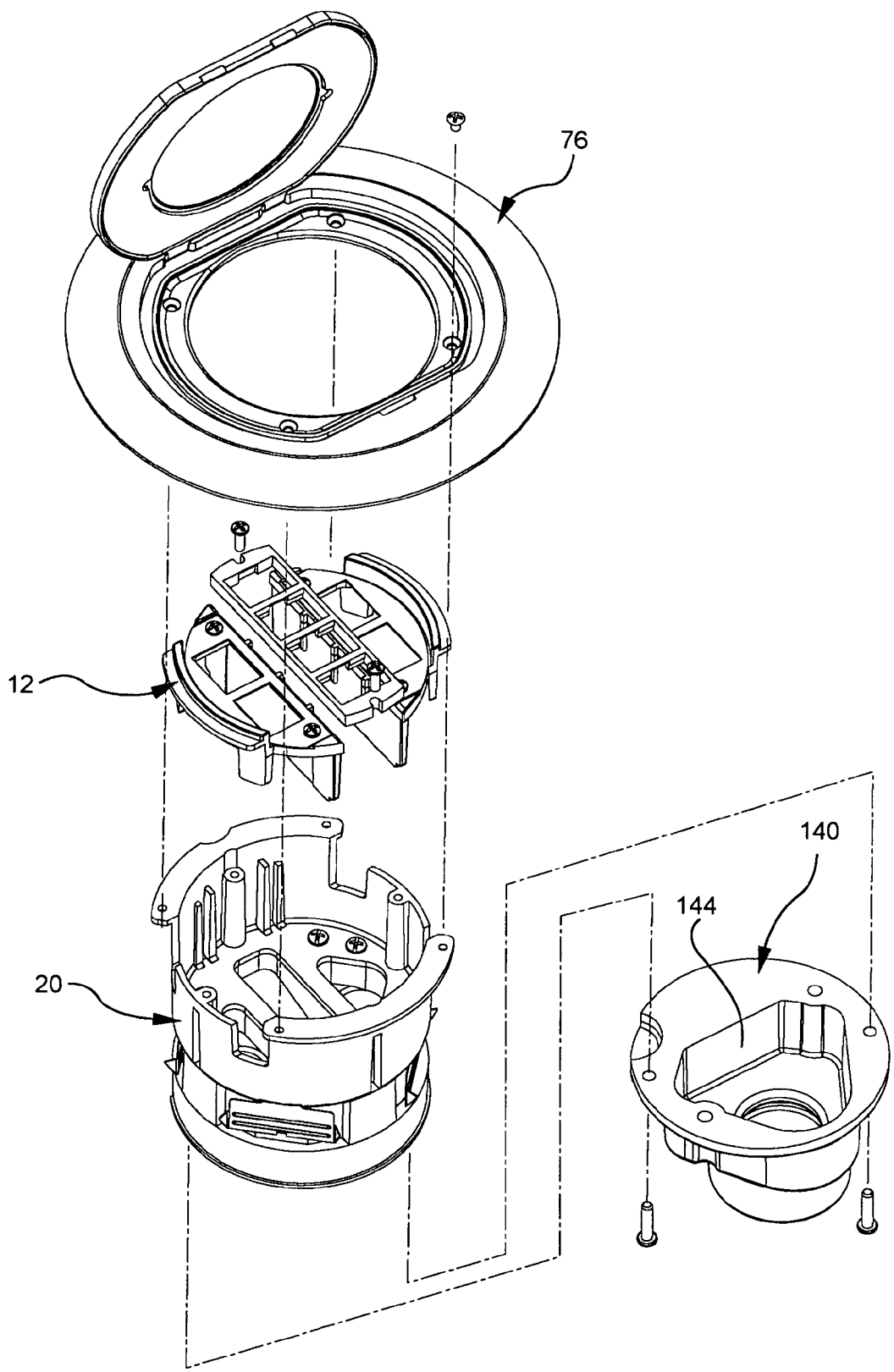
FIG. 10 is a top exploded perspective view similar to FIG. 10.

Referring to FIG. 7, another embodiment of the poke-through 10 includes two power receptacles 42 and 6 data jacks and, preferably, one or both of the mounting caps 120 and 122, which are shown in FIGS. 27-30. Power mounting cap 120 contains conduit opening 124 to which conduit 126 (FIGS. 5 and 6) is secured in the normal fashion, such as by threading. Also, conduit opening 124 connects with well 128 formed within mounting cap 120. Well 128 provides an area where power wires 46 (FIGS. 5 and 6) may be bent prior to entering one of feed openings 32 in fire stop 22. Optional data mounting cap 122 is likewise configured with data opening 130 through which data wires (not shown) can pass. Data opening 130 is adjacent with cavity or well 132 that also provides an area where the data wires may be bent prior to entering fire stop 22. Because poke-through 10 in this embodiment employs data connectors in addition to those provided by center data plate 50, cavity 132 extends so as to provide access to data feed 30 as well as to the other feed opening 32 in fire stop 22.

Figure 11:
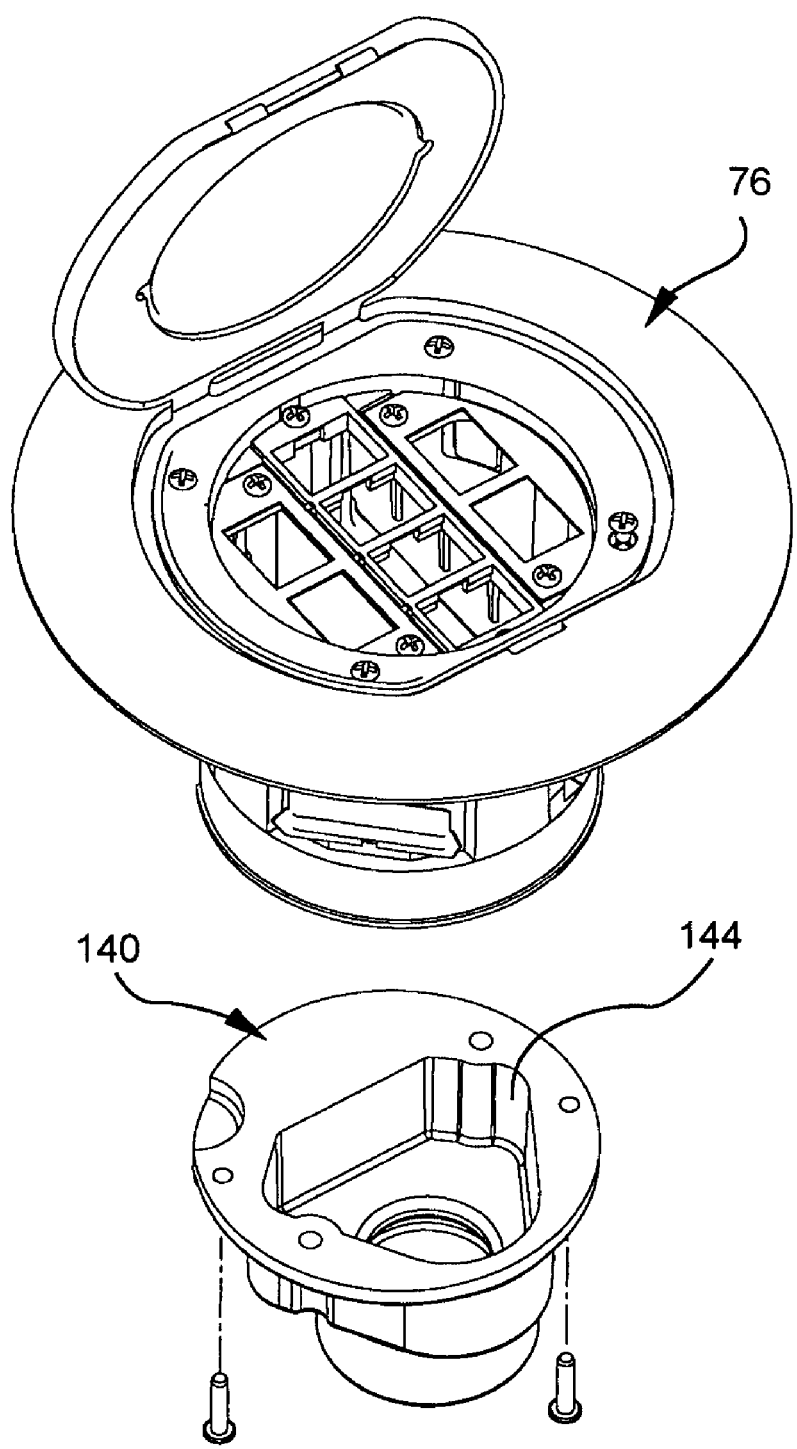
FIG. 11 is a top perspective assembled view of the assembly shown in FIG. 9.
Figure 12:
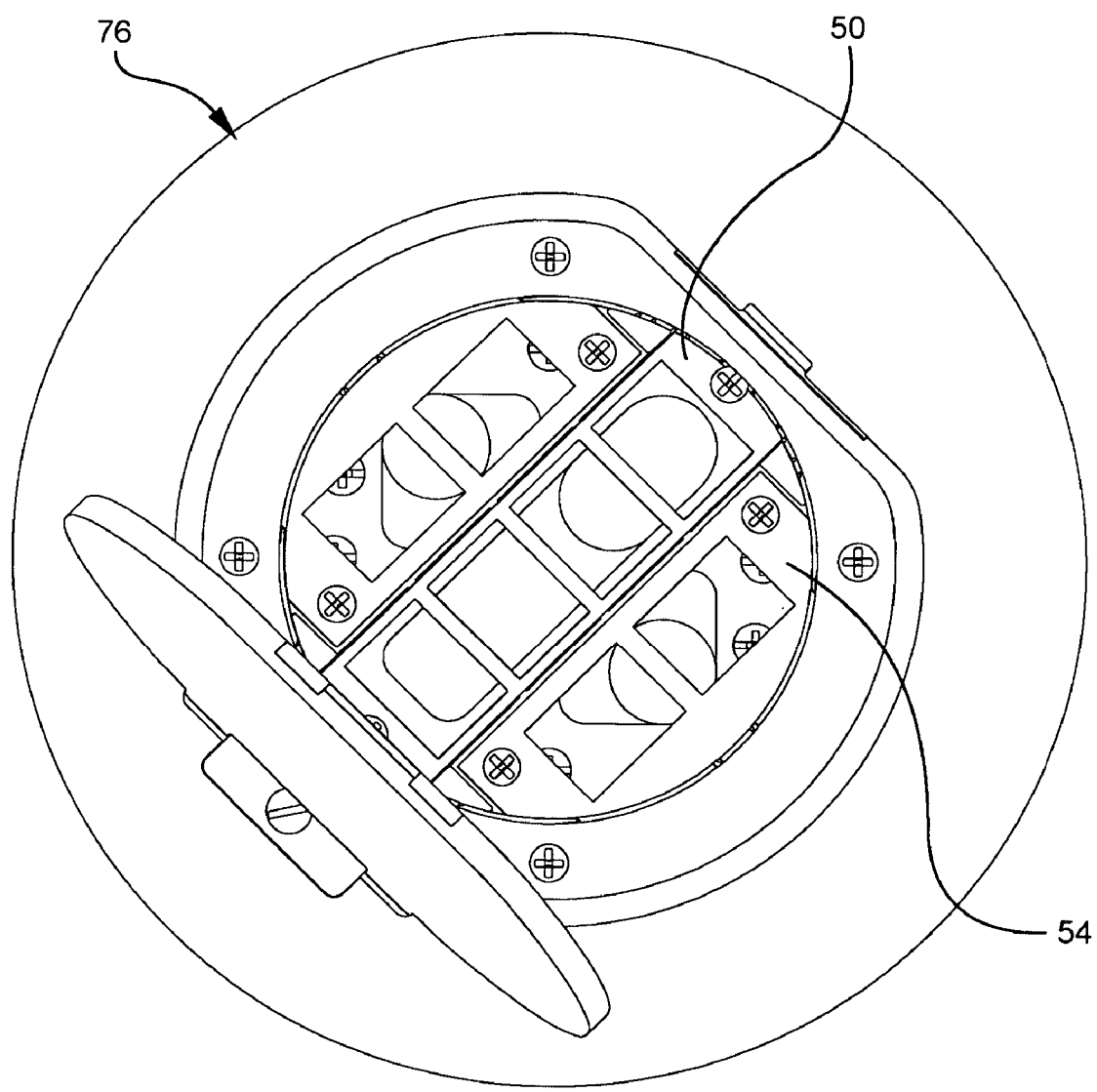
FIG. 12 is a top perspective assembled view of the assembly shown in FIG. 9
Figure 31:
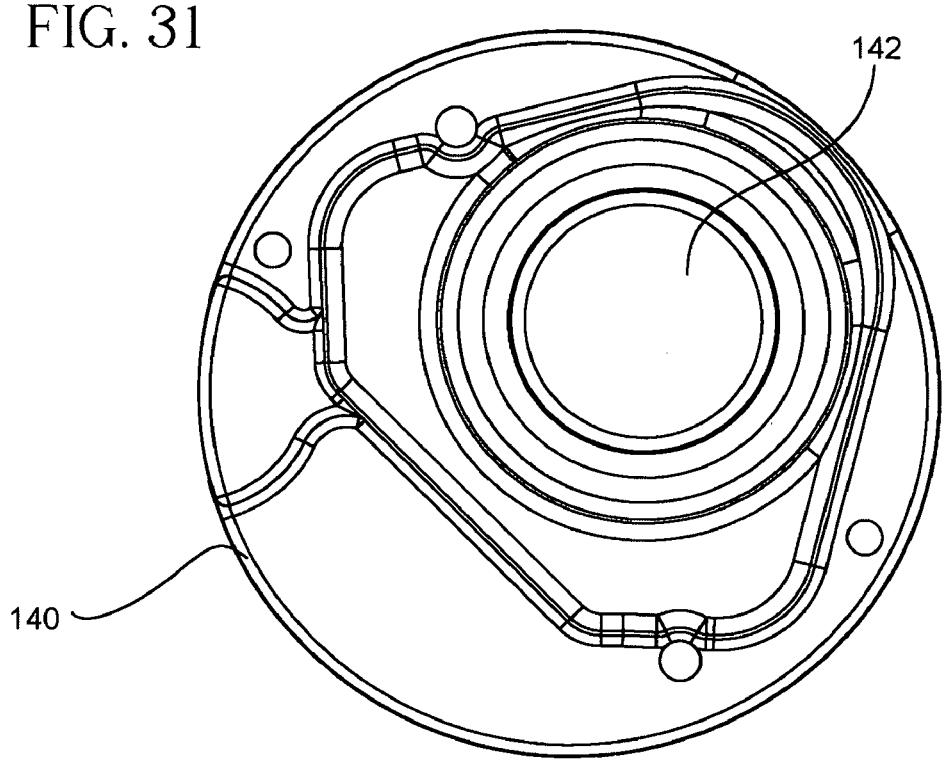
FIG. 31 is a bottom view of the mounting cap shown in FIG. 9.
Figure 32:
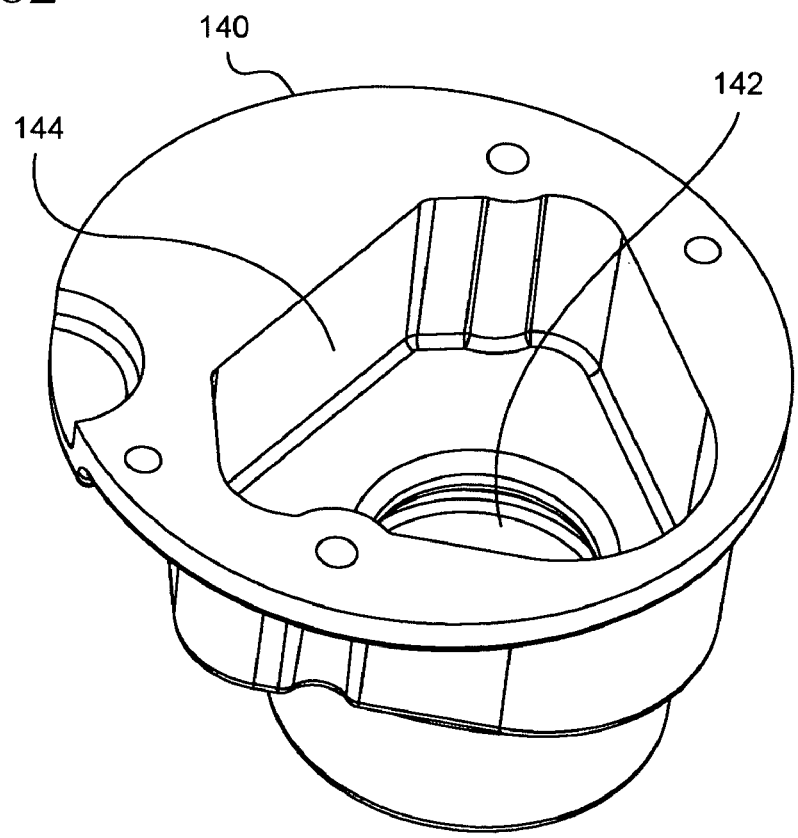
FIG. 32 is a top perspective view of the mounting cap shown in FIG. 9.

The embodiment of poke-through 10 shown in FIG. 11 includes eight data jacks, and no power feeds. In this case, mounting cap 140 as shown in FIGS. 31 and 32 is also preferably included. Data mounting cap 140 is configured with opening 142 through which data wires can pass. This opening 142 connects with well 144 formed within mounting cap 140. Cavity or well 144 provides an area where the data wires may be bent prior to entering feed openings 30 and 32 of fire stop 22.

Accordingly, the modularity of both upper connector ports 12 and lower mounting caps 14, all secured to a body 20, enables poke-through 10 to accommodate nearly every need or configuration a user may desire. Also, poke-through 10 can be configured with the desired connectors long after body 20 is secured in the concrete floor. There is no need, therefore, to know the desired configuration beforehand. Thus, the poke-through 10 of the present invention can advantageously be modified in the field with more, less, and/or different connectors.

The embodiments of the poke-through of the present invention can consequently include any of the connector supports with any appropriate combination of plates and connectors of the present invention. Any of these embodiments can also include any of the mounting caps of the present invention that can accommodate the particular chosen connector configuration.

With body 20, therefore, many different poke-through configurations can be assembled. Such added-on parts or components can themselves be changed out as needed from this sub-assembly should the connector configuration change. These added-on parts, subject to change, can be located on either side of the flooring or the fire/smoke retardant material to be installed in the floor. Accordingly, the modularity or interchangeability of the poke-through extends to both the cable entrance end as well as the cable termination end of the poke-through. Also, these added-on components on either side of the body can be readily changed during assembly or afterwards. Such modularity is not limited to the manufacturer as these added-on components can also be readily changed just prior to, during and even after the installation of the poke-through in the floor.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A poke-through device for installation in a hole in a floor structure, said floor structure defining a floor in a first working environment and a ceiling in a second working environment, said second working environment including a junction box, said poke-through device comprising:
    a body having upper and lower ends and sized for insertion within said hole, said lower end communicating with said junction box and said upper end including a receptacle-receiving basket, said basket defining a peripheral wall, wherein said peripheral wall includes at least one channel extending in a direction generally perpendicular to said flour; and
    a connector supporting bracket sized to removeably engage said channel wherein said bracket is maintained in a stationary position upon installation.

2. The poke-through device as set forth in claim 1, wherein said channel is formed by two ribs protruding from said peripheral wall, said ribs extending generally perpendicular to said floor.

3. The poke-through device as set forth in claim 2, wherein at least one of said ribs includes a top surface for supporting said bracket.

4. The poke-through device as set forth in claim 1, wherein said bracket includes a dividing wall for separating a first portion of said basket from a second port on of said basket.

5. The poke-through device as set forth in claim 4, wherein an edge of said dividing wall engages at least a portion of said channel.

6. The poke-through device as set forth in claim 1, wherein said peripheral wall includes at least one recessed portion and wherein said bracket includes at least one protrusion conformed to mate with said recessed portion upon installation.

7. The poke-through device as set forth in claim 1, further comprising:
    at least one first connector for communicating at least one of data and power, said at least one first connector mounted on said bracket.

8. The poke-through device as set forth in claim 7, further comprising:
    at least one plate secured to said bracket for supporting said at least one first connector.

9. The poke-through device as set forth in claim 1 further comprising:
    at least one plate secured to said basket for supporting at least one second connector.

10. The poke-through device as set forth in claim 1, wherein said peripheral wall includes at least one flange for engaging said floor, said at least one flange extending generally parallel to said floor.

11. The poke-through device as set forth in claim 1, wherein said bracket includes at least one flange for engaging said floor, said at least one flange extending generally parallel to said floor.

12. The poke-through device as set forth in claim 1, wherein said body includes at least one wire passageway for communicating said upper and lower ends.

13. The poke-through device as set forth in claim 1, further comprising:
    at least one mounting cap disposed below said lower end, said at least one mounting cap including,
        at least one opening for communicating with said at least one passageway, and
        at least one web to accommodate the bending of a wire passing therethrough, said well communicating with said opening.

14. The poke-through device as set forth in claim 13, wherein said at least one mounting cap includes a first mounting cap configured for communicating at least one fist wire and a second mounting cap configured for communicating at least one second wire.

15. The poke-through device as set forth in claim 13, wherein said at least one passageway includes more than one passageway, said at least one opening includes more than one opening and each of said passageways is in vertical alignment and communicates separately with one of said openings.

16. The poke-through device as set forth in claim 13, wherein said body further includes an intumescent member disposed between said basket and said at least one mounting cap.

17. The poke-through device as set forth in claim 16, wherein said at least one mounting cap includes at least one alignment recess and wherein said intumescent member includes at least one protrusion conformed to mate with said alignment recess upon installation.

18. The poke-through device as set forth in claim 16, wherein said intumescent member includes a hollow inner chamber for accommodating the bending of said wire therein.

* * * * *

UNITED STATES PATENT AND TRADEMARK OFFICE
CERTIFICATE OF CORRECTION

| | | |
|---|---|---|
| PATENT NO. | : 7,271,351 B2 | Page 1 of 1 |
| APPLICATION NO. | : 11/471950 | |
| DATED | : September 18, 2007 | |
| INVENTOR(S) | : Drane | |

It is certified that error appears in the above-identified patent and that said Letters Patent is hereby corrected as shown below:

Column 9, line 67  now reads "to said flour; and"
should read -- to said floor; and --

Column 10, line 13  now reads "from a second port on"
should read -- from a second portion --

Column 10, line 61  now reads "at least one fist wire"
should read -- at least one first wire --

Signed and Sealed this

Twenty-ninth Day of April, 2008

JON W. DUDAS
*Director of the United States Patent and Trademark Office*